(12) United States Patent
Jameson

(10) Patent No.: US 12,312,548 B2
(45) Date of Patent: May 27, 2025

(54) SYSTEMS AND METHODS FOR MANAGING FILTRATION MEDIA BEDS IN GAS AND LIQUID FILTRATION APPARATUS

(71) Applicant: Pure Air Filtration, LLC, Norcross, GA (US)

(72) Inventor: Kevin Jameson, Norcross, GA (US)

(73) Assignee: PURE AIR FILTRATION, LLC., Norcross, GA (US)

( * ) Notice: Subject to any disclaimer, the term of this patent is extended or adjusted under 35 U.S.C. 154(b) by 0 days.

(21) Appl. No.: 18/387,157

(22) Filed: Nov. 6, 2023

(65) Prior Publication Data

US 2025/0092327 A1   Mar. 20, 2025

Related U.S. Application Data

(63) Continuation-in-part of application No. 17/006,515, filed on Aug. 28, 2020, now abandoned.
(Continued)

(51) Int. Cl.
*C10L 3/10* (2006.01)
*B01D 53/04* (2006.01)
(Continued)

(52) U.S. Cl.
CPC .......... *C10L 3/103* (2013.01); *B01D 53/0454* (2013.01); *B01D 53/1412* (2013.01);
(Continued)

(58) Field of Classification Search
CPC ............ B01D 53/0454; B01D 53/1412; B01D 53/346; B01D 2253/108; B01D 2253/104;
(Continued)

(56) References Cited

U.S. PATENT DOCUMENTS 5,856,198 A  *  1/1999  Joffe ................. G01N 33/0031
                                                       436/100
10,132,740 B2   11/2018  Jameson
10,151,683 B2   12/2018  England

FOREIGN PATENT DOCUMENTS

WO   WO-2019060984 A1 *  4/2019  ......... B01D 35/1435

OTHER PUBLICATIONS

Christopher O. Muller, "Control of Corrosive Gases to Avoid Electrical Equipment Failure", Paper Technology, Apr. 2020.

* cited by examiner

*Primary Examiner* — Youngsul Jeong
(74) *Attorney, Agent, or Firm* — Thomas | Horstemeyer, LLP

(57) ABSTRACT

The disclosure relates to methods, systems, and apparatus configured to manage a filtration media bed and apparatuses associated therewith. Information associated with the detection of an amount of one or more target contaminates present in a gas phase or liquid phase in a filtration operation can be provided. One or more target contaminates can be removed from a gas or liquid phase traveling in and through the system via a media bed material. The filtration system media bed arrangement can include a plurality of media bed zones. Sensors or sensor arrangements can detect an amount of target contaminate that has flowed through the filtration apparatus over a period of time vis a vis one or more media bed zones. Condition states for each of the media bed zones or the entirety of a media bed arrangement can be generated to better ensure effective target contaminant removal over time.

17 Claims, 5 Drawing Sheets

Related U.S. Application Data

(60) Provisional application No. 62/894,030, filed on Aug. 30, 2019.

(51) Int. Cl.
*B01D 53/14* (2006.01)
*C02F 1/00* (2023.01)
*C02F 1/28* (2023.01)
*C02F 101/10* (2006.01)
*C02F 101/16* (2006.01)
*C02F 101/20* (2006.01)
*C02F 101/30* (2006.01)

(52) U.S. Cl.
CPC .............. *C02F 1/008* (2013.01); *C02F 1/283* (2013.01); *B01D 2257/304* (2013.01); *B01D 2257/80* (2013.01); *B01D 2258/05* (2013.01); *C02F 2101/101* (2013.01); *C02F 2101/16* (2013.01); *C02F 2101/20* (2013.01); *C02F 2101/306* (2013.01); *C02F 2209/008* (2013.01); *C02F 2209/02* (2013.01); *C02F 2209/22* (2013.01); *C02F 2209/24* (2013.01); *C02F 2209/26* (2013.01); *C02F 2209/28* (2013.01); *C02F 2209/30* (2013.01); *C02F 2209/40* (2013.01); *C02F 2209/445* (2013.01); *C02F 2303/02* (2013.01)

(58) Field of Classification Search
CPC .... B01D 2253/102; C02F 1/008; C02F 1/283; C02F 2101/101; C02F 2101/306; C02F 2101/20
See application file for complete search history.

SYSTEMS AND METHODS FOR MANAGING FILTRATION MEDIA BEDS IN GAS AND LIQUID FILTRATION APPARATUS

CROSS-REFERENCE TO RELATED APPLICATIONS

This application is a Continuation in Part application that claims priority to, and the benefit of, U.S. patent application Ser. No. 17/006,515, filed Aug. 28, 2020, which claims priority to, and the benefit of, U.S. Provisional Patent Application No. 62/894,030, filed Aug. 30, 2019, both of which are hereby incorporated by this reference herein in their entireties.

FIELD OF THE DISCLOSURE

The disclosure relates to methods and systems configured to manage a filtration media bed for use in a gas or liquid filtration operation, and apparatuses associated therewith. Information associated with the detection and/or removal of an amount of one or more target contaminates present in a gas phase or liquid phase in a filtration operation can be provided. Condition states for each of the media bed zones or the entirety of a media bed arrangement can be generated to better ensure effective target contaminant removal in the filtration system over time. The filtration system media bed is provided as an arrangement having a plurality of media bed zones. Target contaminate information is generated by sensors or sensor arrangements configured to provide detection of an amount of target contaminate that has flowed through the filtration apparatus over a period of time in one or more media bed zones arranged in the media bed.

BACKGROUND OF THE DISCLOSURE

Filtration systems are used in various settings to remove or deplete one or more target contaminates from gas, air, and liquids. On a broad level, gas or liquid streams that contain a material that is undesirable can be passed through filtration media configured to absorb or adsorb a target material—for example, a contaminate—from a gas or liquid stream while letting the bulk material pass through to an exit location.

With respect to gas phase filtration systems, atmospheric air, for example in a manufacturing environment, can comprise vaporized or gaseous chemicals such as hydrogen sulfide, sulfur dioxide, nitrogen oxides, chlorine, ammonia, mercaptans, hydrocarbons etc. Such air-borne contaminants can occur from use of chemicals or materials that are subject to off-gassing or from chemical reactions or other processing conditions that result in gases or vapors being released into the environment. In some cases, airborne contaminates can result from a lack of circulation of outside air, such as from tobacco smoke, formaldehyde and other organic compounds from paint and furnishings, food smells etc.

Some airborne contaminates can be a problem in an outside environment. Hydrogen sulfide is an inevitable product of anerobic digestion of sewage and, as such, is a common issue for those living at or near sewage treatment plants. Frequently, those living close to treatment plants—an increasing occurrence in urban settings-will complain to municipal authorities, thus requiring action to address their concerns. In other contexts, biogas production plants create noxious gasses that can limit the locations where these plants can be built.

Besides being important to maintain indoor and outdoor air quality, removal of airborne contaminates is also needed to protect sensitive equipment from corrosion, such as that in data rooms or the like. High concentrations of contaminants can have detrimental effects on electronic equipment which could result in costly downtime. Certain chemical materials, such as hydrogen sulfide, can have a corrosive effect on metals and other substances and their presence in locations where they could prove hazardous are tightly controlled by standards setting organizations.

Gas-phase filtration is a commonly used method to address airborne contamination. In principle, such systems are straightforward: contaminated air is directed by air handlers, via pull-through or push-through air flow, into filtration componentry and is "cleaned" of the target contaminate. Typically, a filtration media bed is used to remove non-particulate matter from streams of air. While materials can be used to absorb or adsorb the contaminates—typically VOC's and the like—out of the air flowing through the system, a more effective method of cleaning the air of many types of contaminates is chemisorption.

As would be appreciated, with chemisorption, there is a chemical reaction between a component in the air flowing through the purification system and a material present in or on the filtration media bed. This chemical reaction effectively pulls the target chemical out of the air by creating a stable compound that is bound to the media bed material in the form of non-toxic salts that can be safely disposed of. In some implementations, the chemical reaction can be reversed to strip the chemisorbed material from the media bed material. However, given the relatively low cost of most filtration media bed material this is not done as frequently.

The chemical makeup of the filtration media bed material is selected based on the chemistry of the gas that is targeted for removal from the air stream. The filtration media bed material can be selected to target contaminants such as sulfur oxides, hydrocarbons, formaldehyde, organic acids, hydrogen sulfide, nitric oxide, VOC's, etc. For chemisorptive gas phase filtration processes substances like activated carbon and sodium permanganates can be used.

Because the method of operation is a chemical reaction, the effectiveness of a chemisorption process can be directly related to the ability of the filtration media bed material to react with the target material, such as a contaminate gas, passing through the filtration system. As would be appreciated, the ability of a filtration media bed material to remove a target contaminate from an air stream will generally be dependent on the capacity of the media bed material, which can become exhausted at some time. In short, filtration media bed material used in gas phase filtration systems has a finite life and therefore must be changed regularly. Improper management of the lifecycle of filtration media can cause failure of the filtration system.

Media bed material is also used to remove contaminates, such as dissolved gases, from liquid phases, for example, municipal water supplies. Hydrogen sulfide is a common contaminate of wastewater systems and drinking water obtained from wells. These liquid filtration systems typically use activated carbon and other materials, depending on the material that is being targeted for removal from the liquid phase. As would be appreciated, the effectiveness of these systems can be dependent on the ability of the filtration media to suitably remove the target material from the liquid as it passes through the filtration system.

In other applications, media bed material can be used to remove target contaminates that are present in a liquid as other liquids or as solids. For example, a dissolved, solvated, or suspended material that has a chemical charge or other feature that can be targeted by a media bed characteristic can be used to remove a target material from a liquid stream.

Changeover of filtration media bed materials can be according to a timed sequence, for example, once every x number of weeks, months, etc. However, such timed replacement typically does not take into account variations in the amount of target material that may be present in the subject environment. If the effectiveness of the filtration media bed material is of a longer duration due to a lesser amount of one or more target contaminates being present, the filtration media bed will be changed before needed, thus leading to wasted money and effort. Conversely, if the filtration media bed is changed after it loses its effectiveness to collect the target material, the filtration will be ineffective and will allow the undesired—or even dangerous-materials to be released into the subject environment.

Methods to measure the effectiveness of a filtration media bed visually exist. In this regard, the color of the filtration media bed can be observed visually or via instrumentation, where the color change is indicative of loss of effectiveness for the filtration media bed composition. However, such methodology is only a generally qualitative assessment of the filtration effectiveness of the overall filtration media bed material and can result in changing of the filtration media bed material too early or too late as noted. Moreover, such methods generally require diligent observation by personnel, and thus are subject to failure due to lack of compliance.

There remains a need for improvements in the ability to track the effectiveness and condition states of, and associated identification of the need to refresh or replenish, a media bed material that is used in filtration processes. There is also a need for detection of an amount of one or more target contaminates that are in an environment proximal to filtration system and/or that are removed from the filtration system via the media bed material. The present disclosure provides this and other improvements.

SUMMARY OF THE DISCLOSURE

Aspects of the present disclosure are related to methods, systems, and apparatus configured to manage a filtration media bed and apparatuses associated therewith. In one aspect, among others, a system for operation of a gas or liquid phase filtration system comprises an apparatus; a media bed arrangement; at least one sensor or sensor arrangement; and a microprocessor in communications engagement with the at least one sensor or sensor arrangement. The apparatus comprises a gas or liquid phase entry location; a gas or liquid phase travel path; and a gas or liquid phase exit location. The media bed arrangement comprises a plurality of media bed zones in flow communication with the gas or liquid phase travel path, wherein each of the plurality of media bed zones is each, independently, configured with a media bed material selected to remove at least some of one or more target contaminates from a gas or liquid phase flowing through the gas or liquid phase travel path. The at least one sensor or sensor arrangement configured with each media bed zone of the plurality of media bed zones to detect an amount of one or more target contaminates in each media bed zone during one or more times during a gas or liquid phase filtration operation, wherein: each of the at least one sensor or sensor arrangement is configured to detect one or more signal changes associated with a presence or absence of the one or more target contaminates in each of the plurality of media bed zones during the gas or liquid phase filtration operation; and a detected amount for the one or more target contaminates is provided for each media bed zone independently of another media bed zone. The microprocessor is in network communication with a cloud computing system configured to: receive information generated from operation of the system during a first filtration operation; and deploy information from a database of information derived from operation of the first filtration operation during one or more previous filtration operations.

In one or more aspects, the deployed information can be derived from operation of the system during one or more previous filtration operations. The deployed information can be derived from operation of a collection of filtration systems installed at different locations. Either or both of the deployed or received information can be associated with one or more of: a condition state for the media bed material in each media bed zone during the gas or liquid phase filtration operation; an amount of the one or more target contaminates at a media bed zone in direct communications engagement with the gas or liquid phase entry location during the gas or liquid phase filtration operation; or an amount of the one or more target contaminates at a media bed zone that is in direct communications engagement with the gas or liquid phase exit location during the gas or liquid phase filtration operation. Either or both of the deployed or received information can be associated with one or both of a filtration efficiency of each of the media bed zones or an overall efficiency of the media bed during the one or more previous filtration operations and wherein information associated with the filtration efficiency is derived from one or more operational parameters of the system generated during the one or more previous filtration operations. Either or both of the deployed or received information can be associated with media bed material condition state indicating an amount of remaining effectiveness for the media bed material in each media bed zone, thereby providing information associated with a need to replace or replenish the media bed material in each media bed zone.

In various aspects, the media bed material can be selected for removal of at least one target contaminate during the gas or liquid phase filtration operation by physical absorption, physical adsorption, or chemical reaction between the one or more target contaminates and at least some of the media bed material in each of the plurality of media bed zones. Each of the at least one sensor or sensor arrangement can comprise a corrodible material configured to corrode in the presence of at least one of the one or more target contaminates during the gas or liquid phase filtration operation. Each sensor arrangement can comprise a plurality of sensors configured with a first corrodible material; and each of the plurality of sensors can be independently configured with a different amount of the first corrodible material, thereby generating different levels of signal changes for detection when each of the plurality of sensors in each sensor arrangement is contacted with at least one of the one or more target contaminates during the gas or liquid phase filtration operation. The media bed arrangement can be in communications engagement with one or more gas or liquid sampling elements configured to sample an amount of gas or liquid from each individual media bed zone of the plurality of media bed zones; and the at least one sensor or sensor arrangement can be positioned at a location exterior to the apparatus, thereby providing detection of the amount of the one or more target contaminates in each media bed zone at a sensor or sensor arrangement location substantially exterior to the gas or liquid phase travel path.

In one or more aspects, the received or deployed information can be associated with one or more of: a timeline of the detection of the amount of the one or more target contaminates by the media bed material in each of the plurality of media bed zones; a prediction of a remaining effectiveness of the media bed material in each of the plurality of media bed zones; an amount of the one or more target contaminates in an environment proximal to the gas or liquid phase entry location; and/or an amount of the one or more target contaminates in an environment proximal to the gas or liquid phase exit zone. The one or more operational parameters can comprise: an installed location of the system; a manufacturer of the system; an operator of the system; or one or more rules or instructions associated with operational compliance of the system. The one or more operational parameters can comprise: an environmental temperature; a time period or season; a gas or liquid flow rate through the media bed arrangement; a feedstock identity or type; a filtration media type; a media zone cross-sectional volume; or a media bed arrangement cross-sectional volume.

In various aspects, the system can be configured for treatment of wastewater; and the one or more target contaminates comprise hydrogen sulfide. The system can be associated with a biogas production process; and the one or more target contaminates comprise hydrogen sulfide. The system can be in communications engagement with a second sensor system configured to detect a presence of a different target contaminate present in the gas or liquid stream during the first filtration operation. The first filtration operation can be associated with a biogas production process; and the different target contaminate comprises water. Either or both of the deployed or received information can be associated with one or more of: a feedstock type or source; a flow rate; an environmental temperature at which the first filtration operation is conducted; a location of the production process; a media bed material composition; a manufacturer of equipment associated with the production process; an intended composition of biogas output from the process; or one or more compliance-related rules associated with emissions of gasses during the production process. The one or more target contaminates can comprise: hydrogen sulfide; oxygen; methane; carbon dioxide; or hydrogen.

Additional advantages of the disclosure will be set forth in part in the description that follows, and in part will be apparent from the description, or may be learned by practice of the disclosure. The advantages of the disclosure will be realized and attained by means of the elements and combination particularly pointed out in the appended claims. It is to be understood that both the foregoing general description and the following detailed description are exemplary and explanatory only and are not restrictive of the disclosure, as claimed.

DETAILED DESCRIPTION

Figure 1:
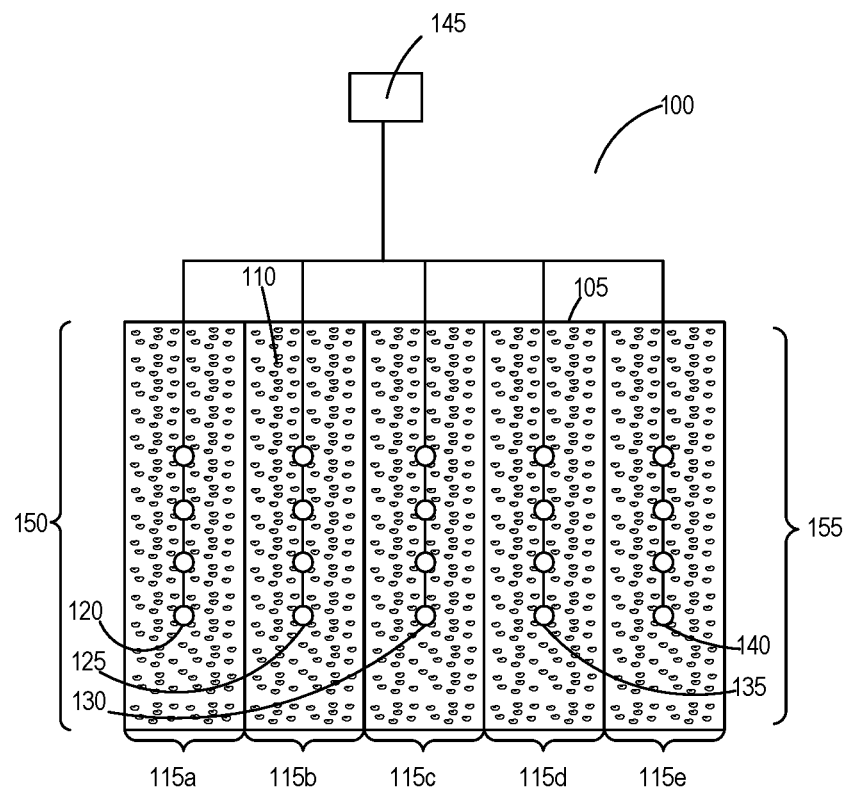
FIG. 1 is an exemplary configuration of an implementation of the present disclosure using corrodible sensors or sensor arrangements, in accordance with various embodiments of the present disclosure.

Before the present disclosure is described in greater detail, it is to be understood that this disclosure is not limited to particular aspects described, and as such may, of course, vary. It is also to be understood that the terminology used herein is for the purpose of describing particular aspects only and is not intended to be limiting. The skilled artisan will recognize many variants and adaptations of the aspects described herein. These variants and adaptations are intended to be included in the teachings of this disclosure and to be encompassed by the claims herein.

Prior to describing the various aspects of the present disclosure, the following definitions are provided and should be used unless otherwise indicated. Additional terms may be defined elsewhere in the present disclosure.

All publications and patents cited in this specification are herein incorporated by reference as if each individual publications or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publications by virtue of prior disclosure. Further, the dates of publications provided could be different from the actual publications dates that may need to be independently confirmed.

Any recited method can be carried out in the order of events recited or in any other order that is logically possible. That is, unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

As used herein, "comprising" is to be interpreted as specifying the presence of the stated features, integers, steps, or components as referred to, but does not preclude the presence or addition of one or more features, integers, steps, or components, or groups thereof. Moreover, each of the terms "by", "comprising," "comprises", "comprised of," "including," "includes," "included," "involving," "involves," "involved," and "such as" are used in their open, non-limiting sense and may be used interchangeably. Further, the term "comprising" is intended to include examples and aspects encompassed by the terms "consisting essentially of" and "consisting of." Similarly, the term "consisting essentially of" is intended to include examples encompassed by the term "consisting of."

As used in the specification and the appended claims, the singular forms "a," "an" and "the" include plural referents unless the context clearly dictates otherwise.

Unless defined otherwise, all technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

As used herein, the terms "about," "approximate," "at or about," and "substantially" mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In such cases, it is generally understood, as used herein, that "about" and "at or about" mean the nominal value indicated+20%, +15%, +10%, +9%, +8%, +7%, +6%, or +5% of the specified value, e.g., about 1" refers to the range of 0.8" to 1.2", 0.8" to 1.15", 0.9" to 1.1", 0.91" to 1.09", 0.92" to 1.08", 0.93" to 1.07", 0.94" to 1.06", or 0.95" to 1.05", unless otherwise indicated or inferred. It is understood that where "about," "approximate," or "at or about" is used before a quantitative value, the parameter also includes the specific quantitative value itself, unless specifically stated otherwise.

Any ratios, concentrations, amounts, and other numerical data can be expressed herein in a range format. Such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. Where the stated range includes one or both of the limits, ranges excluding either or both of those included limits are also included in the disclosure, e.g., the phrase "x to y" includes the range from 'x' to 'y' as well as the range greater than 'x' and less than 'y'. The range can also be expressed as an upper limit, e.g., 'about x, y, z, or less' and should be interpreted to include the specific ranges of 'about x', 'about y', and 'about z' as well as the ranges of 'less than x', less than y', and 'less than z'. Likewise, the phrase 'x, y, z, or greater' should be interpreted to include the specific ranges of 'about x', 'about y', and 'about z' as well as the ranges of 'greater than x', greater than y', and 'greater than z'. In some aspects, the term "about" can include traditional rounding according to significant figures of the numerical value. In addition, the phrase "about 'x' to 'y'" includes "about 'x' to about "y."

The term "substantially" is meant to permit deviations from the descriptive term that do not negatively impact the intended purpose. All descriptive terms used herein are implicitly understood to be modified by the word "substantially," even if the descriptive term is not explicitly modified by the word "substantially."

Although any methods and materials similar or equivalent to those described herein can also be used in the practice or testing of the present disclosure, the various methods and materials suitable for use with the various disclosures disclosed herein are now described. Functions or constructions well-known in the art may not be described in detail for brevity and/or clarity.

A gas phase gas or liquid phase can comprise or have the potential to comprise (but may not actually comprise) one or more target contaminates, where the target contaminates are selectable for removal, depletion, or measurement from the gas or liquid stream as it flows through the filtration apparatus from an entry location to an exit location for on a filtration apparatus configured with media bed material as described herein.

In some aspects, "target contaminates," can comprise contaminates comprising gaseous materials that are incorporated in a gas or liquid phase that are desirable for removal of or, more broadly, for management of within a filtration operation. Such management is conducted by directing a gas or liquid phase through a media bed material in a filtration apparatus having a media bed arrangement therein. The identity of a "target contaminate" will be relevant in context.

In non-limiting examples, "target contaminates" are gases present in a gas phase or a liquid phase. In non-limiting examples, such gases can comprise one or more of hydrogen sulfide, sulfur dioxide, nitrogen oxides, chlorine, ammonia, mercaptans, hydrocarbons, and VOC's. Such target contaminates can be characterized as "undesirable," in that they are either or both of a cause of odors when present or considered to be toxic or dangerous to the health of humans, animals, or vegetation. In some cases, the target contaminates can be caustic or otherwise cause negative effects when the target contaminate comes into contact with surfaces, such as by resulting in deterioration of a metallic or metal-containing material immediately or over a period of time.

In further implementations, the gas or liquid phase having one or more target contaminates incorporated therein can comprise a biogas. Traditional biogas plants extensively utilize a wide range of waste materials such as feedstock, which includes biomass, among other types of waste. Biogas currently recognized as a promising bioenergy alternative, since it can be from animal or human biological waste and/or wastewater. However, raw biogas typically can contain various secondary impurities such as carbon dioxide, hydrogen sulfide, siloxanes, nitrogen oxides (NOx), ammonia, and halogens. In this regard, during processing, relatively high concentrations of hydrogen sulfide are often present, which can cause corrosion, since significant $H_2S$ levels may corrode pipes and process instrumentation. Remediation of such corrosion can result in substantial costs to a biogas manufacturer. Moreover, expectations of odor as a side effect of biogas production often prevent location of biogas plants in areas where appropriate placement may be beneficial, such as in areas where people live. Since populated areas are where infrastructure is already in place to transport gas to homes, businesses, etc., a current inability to build biogas plants in such locations can be viewed as an impediment to the adoption of biogas processing as a replacement for natural gas generated from non-renewable sources. The contaminate removal methodology herein can therefore be expected to provide needed improvements to odor reduction in biogas production, which could improve the ability to gain approval for building biogas production facilities in locations where gas pipelines are already in place. That is, the odor reduction methodologies herein could result in an earlier adoption of biogas as a form of renewable energy.

In further aspects, a "target contaminate" is a liquid that can be included in a liquid phase that is subjected to a filtration operation. For example, a high value liquid can comprise an undesirable liquid material that is considered to be a "target contaminate" in accordance with the disclosure, such as an undesirable coloration in a liquid foodstuff. The media bed material can be selected for removal of the target contaminate via a filtration process as discussed herein.

In further aspects, a "target contaminate" that is a solid in a liquid phase can comprise a material that is dissolved, solvated, or otherwise suspended in a liquid phase. The target contaminate can be removable from the liquid phase via selection of a suitable media bed material, as would be appreciated.

In broad constructs, the present disclosure relates to gas and liquid phase filtration systems, devices, and methods for the management of a filtration apparatus and media bed material associated therewith for use in a gas or liquid phase filtration operation. The gas or liquid phase filtration apparatus is configured with a media bed arrangement having media bed zones that are each independently in communications engagement with sensors or sensor arrangements operational to detect an amount of the one or more target contaminates in each individual zone during the filtration operation. A gas or liquid phase filtration system operational according to the methods and systems herein will comprise an entry location for the gas or liquid phase that may or may not include a target contaminate that may be present therein and that is selected for removal, detection, qualification, or quantification directly or indirectly via the flow of the gas or liquid phase over a media bed material.

In a notable aspect, the media bed for use in the filtration apparatus is arranged as a plurality of media bed zones comprising a volume of media bed material. In some implementations, each of the media bed zones comprises a volume defined by a first end and a second end and corresponding exteriors for the outer boundaries of the filtration media bed, for example an inner portion of a housing for the filtration apparatus. The gas or liquid phase travel path is typically substantially coextensive with each of the plurality of media bed zones so as to allow any gas or liquids to be in gas or liquid communication with substantially all of the media bed material therein as intended for removal of any target contaminates. However, other gas or liquid flow paths through the filtration apparatus are contemplated.

A media bed arrangement that comprises a plurality of media bed zones can comprise an entrance and exit location, each of which is arranged proximal to an entry point for a first media bed zone and an exit point for a last media bed zone. In this regard, the media bed arrangement can be described as comprising a series of media bed zones arranged from a forward location where a gas or liquid phase comprising a target contaminate enters the media bed arrangement and a rearward location where the gas or liquid phase exits the media bed arrangement. As would be appreciated, when the gas or liquid phase exits the media bed arrangement, the gas or liquid phase should be substantially free of the target contaminate at least because the target contaminate will be removed from the gas or liquid phase as it travels through the media bed arrangement at some location after the entry point and before the exit point. In this regard, the entry point and exit points do not operate at locations where the target contaminate may be removed from the gas or liquid phase traveling through the media bed arrangement.

In further implementations, the media bed arrangement can be configured as a plurality of separate stand-alone containers or vessels that can be arranged in series. In this configuration, the filtration media bed arrangement can comprise a plurality of individual filtration elements each having a filtration medium present configured therein. Each of the individual filtration elements are configured so that the gas or liquid travel path comprises each of the individual filtration elements, that is, each of the filtration elements arranged in series. Each filtration element can be in individual communications arrangement with a sensor configured to identify an amount of remaining effectiveness of a filtration media present in that filtration element. Accordingly, an amount of remaining effectiveness of media bed material in an individual filtration element can be determined and an attendant need to replace or replenish that element can be determined, as set out further herein. In this regard, the media bed material in each individual filtration element can be separately exchangeable if a sensor reading indicates that the effectiveness of that media to remove the target contaminate from a liquid or gas stream is depleted or exhausted.

The sensor in communications engagement with each individual filtration element can be arranged exterior thereto, for example, a sample of the gas or liquid stream actually or potentially comprising a target contaminate can be extracted and evaluated in a location that is exterior to that filtration element. For example, an amount of gas or liquid that has traveled through an individual filtration element can be sampled at a location rearward of that filtration element such that the sampling location can allow a target gas or contaminate filtration effectiveness of an individual filtration element and the media bed material therein to be established in real time or substantially in real time. Each location can sample a stage or position in a biogas production process, and the effectiveness of removal of one or more target contaminates associated with each stage or position can be detected. A need to replace or refresh the media bed material in a filtration zone or in an individual filtration element can be identified according to a determination of an amount of target contaminate that is (or is not) removed from the gas or liquid during travel thereof as measured at a rearward location to the filtration zone or filtration element.

The sensors or sensor arrangements can comprise a material that is configured to generate an electrical or other signal in the presence of one or more target contaminates, where such generated signal can suitably be detected and useful information provided therefrom for one or more locations, areas, or zones in the media bed during or after a filtration operation. In a further implementation, the sensors or sensor arrangements proximal to and in communication with each media bed zone are configurable to detect an amount of target contaminate in a gas or liquid stream flowing through and over the filtration media bed. In another implementation, a portion of the gas or liquid phase is in flow communication with a sensor or sensor arrangement located external to the filtration apparatus, an implementation of which can be useful when explosion or fire is a concern.

The present disclosure provides an improvement over prior art methodology at least due to an ability to detect via a sensor or sensor arrangement an amount (which may be by detection of no amount) of one or more target contaminates in a gas or liquid phase. In implementations, the gas or liquid phases can be derived from environments that may contain a target contaminate that is of interest for management thereof, such as one or more of removal, detection, quantification, or qualification. Such an improvement is, in one aspect, associated with the ability to determine whether, and in some implementations, an amount of, one or more target contaminates that have already come into contact with different locations/areas of a media bed material within a filtration apparatus. To this end, the media bed is provided as an arrangement having media bed material configured as a plurality of zones, where each zone is configured to be in communications engagement with at least one sensor or sensor arrangement. At least some of the filtration media bed zones in a filtration system configured according to the present disclosure can independently be monitored for condition state in real-time or substantially real-time. Still further, the system can be configured to provide information associated with determined actual or relative amounts of target contaminates present in the gas or liquid phase that passes through the media bed material before and after a volume of gas or liquid has flowed from an entry location to an exit location on the filtration apparatus.

In an implementation, filtration media bed effectiveness can be detectable at the level of an individual media bed zone or a plurality of individual media bed zones. Such discrete zone level detection can provide information to an operator about the relative life remaining in the effectiveness of each of media bed material zones or in the media bed overall. The ability of the filtration media bed material to remove or deplete such one or more target contaminates from the gas or liquid stream traveling through the media bed can be determined and correlated with the useful life of the media bed material and the need to replace or replenish it. When a signal is generated that indicates that one or more media bed zones have been depleted of target contaminate removal and/or detection effectiveness, the subject media bed can be replaced or refurbished on a zone level or as a whole media bed.

In further aspects, the present disclosure relates to sensors or sensor arrangements that are associated with electrical signal-generating materials. The sensors or sensor arrangements can be configured to generate an electrical signal upon exposure to an amount of target contaminate in a gas or liquid. Thus, the sensor or sensor arrangements can be said to "detect an amount" of one or more target contaminates in a gas or fluid stream flowing through the media bed arrangement in a filtration operation. Such generated electrical signals can be measured digitally, As would be appreciated, digital circuitry has the benefit of enhancing the ability to amplify a signal suitably to measure smaller changes. Moreover, a sensor or sensor arrangement based on a digital framework can incorporate fewer exposed electronics that can be subjected to corrosion from the target contaminate(s) present in a subject gas or liquid stream/phase. As discussed elsewhere, the sensor or sensor arrangements are in operational engagement with processing circuitry comprising, e.g., a microprocessor controller and associated hardware, software, firmware or a combination thereof. In some embodiments, the processing circuitry can comprise, e.g., a discrete logic circuit (or circuits) having logic gates for implementing logic functions upon data signals, an application specific integrated circuit (ASIC) having appropriate combinational logic gates, a programmable gate array(s) (PGA), a field programmable gate array (FPGA), etc.

A generated electrical signal can be detected by any suitable device, circuitry or system that is capable of detecting an electrical signal generated by the sensor or sensor arrangement. For example, an electrochemical detector can be used to detect corrosion. With electrochemical sensing, a target contaminate can generate a chemical reaction with the sensor or sensor arrangement material, thus producing a current that is proportional to or otherwise associated with a concentration of target contaminate present in the media bed zone. The sensors or sensor arrangements can be configured to use very little power and show good responses to various target contaminate concentrations or amounts in the subject gas or liquid stream over a wide range of ambient conditions. Such sensors or sensor arrangements can be configured in an explosion proof system to further improve the safety profile of the systems.

In a configuration, the sensor or sensor arrangements can be associated with a material that is corrodible by one or more of the target contaminates that may be present in a gas or liquid phase that is introduced into the filtration system incorporating the media bed material having zones therein. Each of the sensor(s) or sensor arrangement(s) are in operational engagement with processing circuitry comprising, e.g., a microprocessor controller configured to detect a change in a signal generated from the sensor or sensor arrangements, where such signal change directly or indirectly results from a detectable electrical change or response derived from corrosion of the corrodible material occurring from contact with the target contaminates.

Suitable corrodible metallic substances that can be associated with the sensor or sensor arrangements can include any corrodible metal and also can include such metals coated with gold. Examples of suitable corrodible metallic substances, without limitation thereto, include copper, silver, nickel, cobalt, permalloy, aluminum, gold, zinc, platinum, molybdenum, titanium, tungsten, combinations/alloys of these metals, and laminates of such metals which may or may not be coated with gold.

A variety of corrodible or corrosion-related sensors or sensor arrangements can be used in the methodology herein. Suitable sensors or sensor arrangements can have a first, or baseline, measurement or level of a feature or characteristic that can be determined that is associated with a known condition state of a filtration media bed material present in a zone in which the sensor or sensor arrangement is associated. Such notifications can be based upon baseline information such as, for example, a detected resistance of x is correlated with a filtration media bed zone depletion or effectiveness level of y, where such x and y values have been determined in baseline measurements that are used to detect media bed zone condition in actual use case situations.

For a corrodible sensor configuration, the sensors or sensor arrangements can comprise wires that are fabricated from corrodible material will themselves corrode in the presence of a target contaminate that is capable of generating such corrosion. Methodology to indirectly assess media bed effectiveness by including a corrodible wire sensors on a monitoring rod that is placed within the media bed has been developed. U.S. Pat. No. 10,132,740, the disclosure of which is hereby incorporated by reference herein in its entirety, describes corrodible wires mounted in a rod configuration. When in operational engagement with processing circuitry (e.g., comprising a microcontroller), this rod can measure changes in resistance resulting from corrosion of the wire sensors as the sensors are exposed to target contaminates that cause corrosion of the wire sensors upon exposure thereto. When such corrodible wires are configured as sensors or sensor arrangements independently associated with a single media bed zone, each sensor or sensor arrangement can provide a detectable change in resistance that can generate information about a condition of the media bed material at a zone level. In this regard, the rate and amount of resistance change in each sensor or sensor arrangement can be associated with a loss of media bed material effectiveness so that a signal to change the media bed material can be provided when the resistance level reaches a specified level.

Such corrodible wires can be incorporated into a rod, so as to allow only part of the wire to be exposed to the target contaminate, for example a target gas, as is shown in the '740 Patent. As disclosed in the '740 Patent, wired sensors can suitably allow measurement of a change in resistance when each of a first and second end of each wire is in electrical communication with a detector configured to measure a change in that aspect of the wire that is exposed to the corrosive gas that is being targeted. In accordance with the present disclosure, a plurality of individual corrodible wires can be configured to provide duplicative measurement capability, or different amount, such as in the form of differently gauged wires (e.g., 0.1 mil, 1.0 mil and 10 mil) formed from or coated with corrodible material can be included as a plurality of sensors configured as a sensor arrangement as discussed herein.

The present methodology presents an improvement over that of the '740 Patent at least because the incorporation of filtration media bed material zones along a gas phase travel path can allow real-time, or substantially real-time, monitoring of the media bed material condition state at various locations in the media bed, where such locations can be determined independently. This can allow an operator to better understand the relative performance and/or condition of the filtration media bed material in each zone, as opposed to merely having a generalized understanding of the exposure of some or all of the media bed material to the target gas as provided by the '740 Patent disclosure.

In implementations, the electrical signal-generating material can be affixed to a substrate for use as a sensor or sensor arrangement. Such methodologies are disclosed in U.S. Pat. No. 10,151,683, the disclosure of which is hereby incorporated by reference herein in its entirety. As set out in the '683 Patent, a printed circuit board can have a corrodible material of a pre-determined thickness mounted thereon. A power source can be configured to generate an electrical current across the coated substrate and a measurement of the electrical characteristics generated therefrom can be obtained, where the generated electrical characteristics can be associated or correlated with the characteristics of the filtration media bed zone(s) in which that sensor is located. Unlike the methodology of the '683 Patent, however, corrosion of the sensor is not the primary objective in the present disclosure. Rather, the detectable electrical behavior of the sensor can serve as an indirect measure of an amount of target contaminate present in a gas or liquid phase presently or over a time period of interest, as well as providing information about a condition state of the filtration media material in one or more zones in relation to its suitability in removing a target contaminate from air passing through the filtration system having the filtration media bed material disposed therein.

Yet further, a corrodible sensor arrangement configured to measure each filtration media bed material zone can be comprised of a plurality of sensors, where each of the plurality has different measurement capabilities resulting from varying signals that can be detectable from corrosion of the corrodible material associated therewith. As an example of one of these different measurement capabilities, the sensor arrangement can incorporate sensors having differing amounts of corrodible materials associated therewith thereon. An assortment of coated substrates that are configured as sensors for a target contaminate, for example a gas, can be incorporated in a sensor arrangement. A more lightly or less coated individual sensor or a sensor that is of a lower mass of corrodible material can allow detection of an electrical signal that is differentiated from that of other coated substrates. The relative differences detectable within a single sensor arrangement comprising a plurality of individual sensors can allow the condition states of the filtration media bed material within a single zone and optionally areas proximal thereto to be monitored, thus providing even more detailed information about the media bed material present in a filtration system. In some implementations, the incorporation of a plurality of sensors can be useful to detect signal changes that might be too small to detect from deployment of a single sensor. Yet further, appropriate signal amplification methodologies can be utilized to generate a suitably detectable signal.

Still further, at least one of the sensors or sensor arrangements used in a filtration media bed material zone can comprise a quartz microbalance that is configured to measure corrosion. In this implementation, a plate on the microbalance can be fully or partially coated with a material that is corrodible by a target contaminate. When such a sensor is exposed to a gas or liquid comprising the target contaminate, the microbalance can exhibit a change, such as by measuring a change in mass caused by oxidation of the corrodible material or the like, where the change in mass is presented as a detectable electrical signal. Such detectable signal associated with a change in mass can be correlated or associated with an effectiveness of the filtration media bed material in the zone in which the microbalance is located so as to allow a real-time or substantially real-time assessment of the ability of the subject filtration media bed zone and, optionally, the entirety of the filtration media bed material, to remove or deplete the target contaminate from the gas or liquid traveling through the gas or liquid flow path in the filtration apparatus. Yet further, an electrical signal can be used to derive an amount of target contaminate in a gas or liquid stream or the amount of target contaminate to which the one or more zones have been exposed to over a time period of interest.

In yet a further implementation, one or more special purpose sensors, such as electrochemical or optical sensors, can be configured with each of the media bed zones. For example, when the target contaminate is hydrogen sulfide present in a gas phase filtration apparatus, a sensor or sensor arrangement configured to detect hydrogen sulfide can be incorporated in each of the zones. Each of the hydrogen sulfide sensors can be in operational engagement with processing circuitry including, e.g., a microcontroller and associated software or firmware stored in memory. Still further, when more than one target contaminate is of interest for removal, a collection of special purpose sensors or sensor arrangements can be configured in each zone of interest to allow detection of a plurality of target contaminates that may be present in each zone. If a sensor in a media bed zone a location distant from the entry location of the gas or liquid phase indicates that a previous zone has not effectively removed the one or more one or more target contaminates, notification can be provided that the media bed material may need to be changed or replenished.

A number of special purpose sensors are available for implementation with the systems and methods herein. For example, the Spec Digital Gas Sensor uses a screen-printed electrochemical sensor that can detect hydrogen sulfide at up to 10 parts per million. Such a sensor, or grouping of sensors, can be configured in one or more zones in a media bed to detect the presence (or absence) of hydrogen sulfide in each zone, collection of zones, or the bed overall. Still further, the MQ-135 sensor (available at Sainsmart.com), based on $SnO_2$ can be configured to detect more than one target contaminate. In an atmosphere where there may be contaminating gas, the conductivity of the gas sensor changes with the concentration of the contaminating gas increases. MQ-135 can be configured to detect ammonia, sulfide and benzene present in gas phases. As such, they can be used to detect and measure the presence (or absence) of one or more gases in a media bed zone, a collection of media bed zones, or the overall media bed. These detectors can also be used in conjunction with the gas phase filtration equipment and associated sensors or sensor arrangements to detect an amount of one or more target contaminates entering the filtration system at an intake point and the amount of one or more target contaminates exiting the filtration bed after the gas travels through a gas phase travel path.

The sensors or sensor arrangements can be configured to be wired or wireless, and can be compatible with a variety of electronics environments, such as those that employ an Arduino or Raspberry Pi framework. The sensors can be suitably mounted in housings that allow the target contaminate to make contact without also having the sensor or sensor arrangements contacting the media bed material. Air flow or liquid flow through filter media material in filtration apparatus can often be high, and the weight of the filtration media can be significant in the packed systems. As such, the sensors and sensor arrangements can be protected via shields or guards, as suitable for each application.

In a further implementation, a gas or liquid phase filtration system can be configured with one or more sampling ports operationally engaged with one or more filtration media bed zones, wherein the sampling ports are in communications engagement with a sensor or sensor arrangement located exterior to the gas or fluid travel path. The gas or fluid stream can be sampled in an amount to allow detection of a target contaminate. Any electrical or other signal type associated with the sensor or sensor arrangements can thus be isolated from the gas or liquid stream. Such a configuration can be particularly useful in an environment where explosion-proof equipment is indicated. The sampling ports can be opened via a solenoid in communication with a microprocessor or other processing circuitry, with the operation thereof being configurable with other instructions associated with the filtration media bed monitoring system herein. The solenoid operation can be wired or wireless. When the gas or liquid phase is removed from the bulk gas or liquid phase, the sensor or sensor arrangement can further include a detector or analysis technique that is operational external to the filtration apparatus. In some implementations, and in addition to the electrical signal generation functionality discussed herein, the sensor or sensor arrangement can comprise a detector that comprises a spectrophotometer, chromatograph, colorimeter, or the like.

With regard to gas phase filtration systems, real-time or substantially real-time filtration media bed monitoring methodology described herein can be implemented in a variety of gas phase systems in which conventional and/or proprietary media bed compositions are used. To this end, the filtration media bed material monitoring systems of the present disclosure can be configured as a number of different apparatus types in which replaceable gas phase filtration media material is used therein. In non-limiting examples, the systems are suitable for integration into drum scrubbers, vertical bed scrubbers, packed bed systems, and V-Bank transition systems and radial flow systems.

Filtration media bed material for use in the systems, methods, and apparatus of the present disclosure are selected for the target contaminates, as would be appreciated. In non-limiting examples, for gas phase filtration, the absorption filtration media can comprise one or a mixture of potassium permanganate, activated carbon, potassium hydroxide, potassium iodure, or sodium thiosulfate. Chemisorption-based filtration media are often mixed with other materials to serve as low-cost bulking agent and/or to operate as a physical absorption/adsorption media. Such media includes carbon, zeolite, alumina, or coconut-based material.

In a further aspect, the methods and systems of the present disclosure also have utility in liquid filtration systems, such as municipal water systems that can include materials that may cause illness or that may otherwise be undesirable in use.

The sensors or sensor arrangements can comprise sensors that are configured to detect a target material in a liquid having a liquid travel path that is through a media bed configured with media bed material having a number of zones. Sensors or sensor arrangements configured to directly detect a target material in a liquid can be configured with a microcontroller. For example, the SulfiLogger™ (Unisense, Aurhaus, Denmark) allows hydrogen sulfide to be directly detected in water, as well as in gas environments. This sensor utilizes a miniaturized amperometric sensor with an internal reference and a sensing anode. When hydrogen sulfide is detected in an environment, an oxidation generates a current in the picoamp range, which is detectable by a device suitable to detect in this range, such as a microsensor multimeter.

The media bed configuration used in a liquid filtration system can be dependent on the target material being detected in the liquid environment. As would be appreciated, activated carbon is commonly used to adsorb natural organic compounds, taste and odor compounds, and synthetic organic chemicals in drinking water treatment. Adsorption is both the physical and chemical process of accumulating a substance at the interface between liquid and solids phases. Activated carbon is an effective adsorbent because it is a highly porous material and provides a large surface area to which contaminants may adsorb. The two main types of activated carbon used in water treatment applications are granular activated carbon (GAC) and powdered activated carbon (PAC). Activated carbon removes organic contaminants, chlorination byproducts, lead, copper, and certain pesticides. Activated carbon can mitigate the unpleasant chlorine taste and odor left behind by the water treatment facility. Activated carbon can also be used to remove amines and other base compounds such as ammonia.

In addition to activated carbon, catalytic carbon can be used as a filtration medium. Catalytic carbon is a form of activated carbon that is enhanced to increase its catalytic capability. This media bed material is primarily used to rid water of chloramine, which is a chemical that is increasingly used at water treatment facilities to disinfect water. Catalytic carbon can also be used to remove hydrogen sulfide from water, among other things.

In addition to carbon, kinetic degradation fluxion media ("KDF") can be used as a media bed material. This media primarily consists of copper and zinc particles and is used to reduce the levels of water-soluble heavy metals, including chlorine, iron, and hydrogen sulfide.

Yet further, the media bed material can be a mixed bed media that can comprise, as the name suggests, a mixture of different mediums to remove more impurities and toxins from the liquid passing through the media. Such mixed media bed filtration material can include gravel, to filter sediment out of the water, resin to filter tannins out of the water, or catalytic carbon to reduce hydrogen sulfide or chloramine levels. In a further implementation, the filtration system including a media bed arrangement as set out herein can be associated with detection apparatus that might be relevant to a subject filtration process, where a particular filtration process can generate noxious and/or toxic gases. For example, in biogas production, human health can be impacted by impurities that are of interest for reduction or elimination according to both regulated and unregulated (depending on country or region) emissions. As would be understood, "regulated emissions" are substances that have regulatory limits for their maximum levels, while "unregulated emissions" are those without fixed regulatory limits. Impurities considered as regulated emissions in biogas production currently include SOx, NOx, HCl, CO, VOCs, particulate matters, whereas polycyclic aromatic hydrocarbons, furans, dioxins, and aldehydes are considered as unregulated emissions. It follows that processes to generate biogas, for example, can benefit from improvements in monitoring an effectiveness of a filtration process associated with such production for health reasons, as well as to enhance an ability to encourage residents of a location or area in which chemical production, such as biogas, to accept operation of a plant proximal to where they live, work, and/or play.

In accordance with the present disclosure, separate filtration media or filtration elements can be configured to be in fluid communication with one or more stages or parts of a chemical production process in which regulated and/or unregulated gaseous emissions may be generated as an element thereof, such as a process used to generate biogas. In this regard, one of more stages or parts of the production process can be in communications engagement with a media bed arrangement as set out herein. In this regard, a stage or part of the production process can be in fluid communication with a media bed arrangement having a plurality of media bed zones or filtration elements. The media zones or media bed elements can be configured to remove one or more materials from a stream of material generated from a chemical production process, such as one or more regulated or unregulated emissions generated in a biogas production process. In some implementations, the material in the media bed arrangement or filtration elements comprising the removal material—that is, the media bed material in each media bed zone or element—can be configured to remove or deplete a plurality of target contaminates from the subject gas or liquid stream. In other implementations, the material used in a particular media bed zone or filtration element can be selected to be substantially specific for removal of a first target contaminate.

In accordance with the disclosure herein, the effectiveness of a filtration media type in each media bed zone or filtration element can be determined after a gas or liquid stream has traveled through that media bed zone or filtration element by removal of an amount of liquid or gas. A sensor arrangement configured external to a media bed zone or filtration element can be configured to determine an effectiveness (or lack thereof) of a media bed zone or filtration element—and any material selected for use therein—in removing a target contaminate. When an effectiveness of the media bed arrangement having a plurality of zones or elements is determined by analysis of a sample of a liquid or gas stream that traveled therethrough via an associated sensor arrangement to be fully or partially depleted, information can be generated to direct replacement or replenishment that material. This can better ensure that the effectiveness of a media bed arrangement associated with a chemical production process can be maintained as necessary or appropriate in context.

In a further implementation, a media bed arrangement comprising a plurality of zones or elements having media bed material therein can be configured to provide information associated with an efficiency of each zone or element in removing one or more target contaminates from each zone or element as measured by an amount of a target contaminant remaining in a gas or liquid stream after the stream travels through or substantially through that zone or element. Information associated with or derivable from such filtration effectiveness can have utility in selection of media bed material, feedstock selection, process parameters, etc., as discussed herein.

In a further implementation, a media bed arrangement comprising a plurality of zones or elements having media bed material therein can be configured to provide information associated with an efficiency of each zone or element in removing one or more target contaminates from each zone or element as measured by an amount of a target contaminant remaining in a gas or liquid stream after the stream travels through or substantially through that zone or element. Information associated with or derivable from such operation can have utility in selection of media bed material, feedstock selection, process parameters, etc., as discussed herein.

Using wastewater treatment as a non-limiting example, efficiency of a $H_2S$ removal during a production process can be assessed by monitoring an amount of $H_2S$ present in an air stream at various locations along a media bed arrangement. Biofilters can change biogas into noncorrosive form. Sulfur oxidizing bacteria (SOB) converts hydrogen sulfide ($H_2S$) into elemental sulfur by partial oxidation, or sulfate ($SO_4^{2-}$). Besides $H_2S$, other sulfur compounds like thiosulfate and tetrathionate can also be converted to sulfate. Biotrickling filters use a synthetic media to support the growth of natural occurring micro-organisms to convert $H_2S$ into a dilute acid solution, part of which is discharged via a continuous water make-up or overflow.

In an improvement associated with the present disclosure, sampling ports can be arranged along a length of the media bed arrangement (i.e., by zone) to monitor an amount of gas present along a travel path for the air stream. A flow of the air stream can be varied along a length of the filter and information derivable from such variations can be used to manage operation thereof. As currently understood, biofilters, for example biotrickling systems, necessitate contact with bacteria in an empty bed (e.g., a bed that has not previously been in contact with $H_2S$) of about 15-30 seconds in order for the bacteria to consume the $H_2S$ and to generate less corrosive materials that can safely be released from the system. Currently, there is no way to measure the ongoing internal efficiency of these systems, except by monitoring of the intake and exit locations. If the bacteria lose effectiveness, such as by shock loads or starvation due to process variations or equipment malfunctions, $H_2S$ presence at the exit location would be detected using current methodologies, but it may be too late to prevent release of this gas in an environment in need of monitoring. Moreover, a change in interior conditions of the bed may take some time not only to detect, but also to reestablish so that the bacteria therein can regain effectiveness in removing $H_2S$ from a subject stream that is in need of filtration.

An improvement associated with the present disclosure comprising incorporating a plurality of sampling locations along a length of a media bed comprising bacteria or other relevant filtration media to establish an effectiveness of $H_2S$ digestion by bacteria therein across a length thereof. Such length comprises a location rearward of an intake location for an airstream having or potentially having $H_2S$ incorporated therein, where the $H_2S$ is of interest for removal from the airstream. Information derivable from operation of airstream sampling can be used to manage filtration in subsequent operation of the same or a different system.

For example, such generated information can be used to generate an optimum airflow through a biofilter system, such as the referenced biotrickling system. A change in $H_2S$ load (e.g., a "shockload") could benefit from reduction in air flow. Alternatively, a presence of a lower-than-normal $H_2S$ concentration could allow a higher airflow. A need for more or less airflow in a present or a subsequent filtration process could be detected by analysis of an amount of $H_2S$ in one or more zones as compared to information derivable from the system.

Moreover, due to a required retention time to assure suitable $H_2S$ removal, such biofiltration systems used in $H_2S$ removal tend to require a large footprint which can increase the cost of such systems, as well as the ability to install them in some locations. Information derivable according to the present disclosure can allow the effectiveness of such systems to be optimized as compared to present systems. For example, information generated from the methodology herein can generate insights about reduced retention time as a function of air flow to allow a reduction in an amount of biofilter material and an attendant reduction in size of a vessel needed to contain such biofilter material.

While the above example illustrates biofilters used for air streams, it should be appreciated that the systems and methods herein can also have utility in measuring the biofiltration effectiveness of water treatment. In this regard, samples of water along a length of biofilter according to defined zones so as to assess a cross-sectional efficiency of $H_2S$ removal along a liquid flow path from a location after an intake location to an exit location.

Additionally, differences between and among various media bed arrangement configurations and media bed material used therein can be assessed. Such information can further have utility in identification of different media bed arrangements for use in different filtration processes. Yet further, selection of media bed material to be used in one or more media bed arrangements, and the amounts and locations thereof in a media bed arrangement can be expected to be enhanced.

In this regard, the present disclosure provides a heretofore unavailable source of information about a process from which toxic and/or noxious gasses are likely to be generated. By providing information that is secondary (or indirect) to operation of an overall process in which a filtration system is used, differences between and among operation of a media bed arrangement used in conjunction with the filtration system can be determined. Information so derivable can have utility in operating or managing the overall process in which the filtration system is implements, such as in biogas production or wastewater treatment. In other words, information derivable from the processes can be used to improve information generated in such processes where such information can have utility in determining whether and to what extent regulated and unregulated emissions may be generated according to various feedstocks, production parameters, etc., among other things.

While a primary benefit of the filtration media effectiveness assessment is to allow enhanced management of such filtration media—that is, replacement or replenishment on a schedule that is aligned with an actual need to do so—it can be expected that a secondary benefit provided by the information generated herein can be a better understanding of differences that may exist in a production process that may not currently be observable. In other words, information derivable from operation of the filtration processes herein can allow indirect information to be derived from a chemical production process. This could enhance selection of materials, processing parameters, etc. associated with a chemical production process in which toxic and/or noxious gasses may be generated therefrom.

In a further non-limiting example, information generated by or derivable from operation of the filtration system can be associated with information derivable from a second target contaminate removal or depletion process associated with a chemical production process, for example, a moisture removal process using silica gel. As would be appreciated, silica gel is a component that can be used to remove or deplete moisture from non-aqueous gas or liquid stream. An amount of water removed or depleted from a non-aqueous gas or liquid stream can be detected by weight or volume according to known methods and such information can be associated with information derivable from the filtration systems comprising the disclosed media bed arrangement to generate useful information about an associated chemical production process.

For example, in the context of biogas production, silica gel can have utility in removing water and, as would be appreciated, a rate of moisture uptake in a silica gel system can allow an amount of moisture in a biogas production process to be derived. Similarly, differences in a moisture uptake between and among biogas production systems can have utility in allowing various parameters (e.g., feedstock source, flow rates, processes used) associated therewith to be derived, especially when combined with the improved filtration monitoring processes disclosed herein. In this regard, comparison of information derivable from moisture removal or detection apparatus in a biogas (or other relevant chemical process) can be conducted to associate various information from which otherwise opaque process parameters can be derived. This could, in turn, enhance operation of the overall process, such as in selection or pre-treatment of feedstocks as appropriate in context. For example, the generation of toxic or noxious fumes generated from a process could be better managed to enhance an ability to operate production processes in areas where they might otherwise be undesirable.

In some implementations, the sensors or sensor arrangements can be designed to have a finite lifecycle. Such finite lifecycles can be associated with an overall lifecycle of a filtration media bed material zone for which the sensor or sensor arrangement with which it is associated. For example, if a lifecycle of a filtration media bed comprising a plurality of media bed material zones is about three months, the lifecycle of a sensor or sensor arrangement used to assess condition state of the filtration media bed can also be three about months. It can be useful to start with a new sensor or sensor arrangement when a filtration media bed is replaced or replenished, at least because this can facilitate management of the filtration media bed in the gas phase filtration system. However, if the sensor or sensor arrangements are reused between filtration media bed changeouts, a baseline measurement can be generated, and condition state determinations made relative to such baseline at each filter bed changeout event.

The filtration apparatus monitoring system can be a stand-alone system, or it can be configured for use with other components. In regard to a standalone system, a self-contained gas or liquid phase filtration system can include at least an air or liquid entry location, an air handler/blower or pump, a housing configured to contain a filtration media bed filtration material, and an exit location. Such self-contained systems can be useful when large volumes of air or liquid are of interest for filtering or that may contain a higher concentration of target contaminates, at least because these systems can be configured larger volumes of filtration media. As an example of use of the systems with another component, a gas phase filtration system herein can be used to clean air that is directed into clean-room environments. In another example, the gas phase filtration methodology herein can be used in conjunction with a ventilation system in an industrial facility so as to allow the air therein to be maintained at levels of regulated materials that are in compliance with applicable regulations. A liquid phase filtration system can be modular and attachable to a device or system in which a liquid stream flows so as to remove target contaminates as discussed elsewhere herein.

For either or both of gas phase or liquid phase systems, the filtration media beds can be configured as cartridges, removable or stationary modules, or in any suitable configuration. In some implementations, the filtration media bed material zones can be configured as removable modules configurable in the filtration system, where the filtration media material in each of the zones can be individually replaced or replenished without requiring the removal or replenishment of the entirety of the filtration media in all of the zones therein.

In relation to the generation of information associated with the management of a filtration apparatus operational to detect an amount of one or more target contaminates, a previously unused sensor or sensor arrangement that comprises the electrical signal-generating material can be positioned in or in communication with a fresh filtration media bed material in a media bed zone that is one of a plurality of media bed zones on a media bed arrangement configured for use in or proximal to a gas or liquid phase filtration process. In other implementations, a previously used sensor or sensor arrangement can be calibrated by taking a baseline measurement that can be associated with a fresh or new media bed material in a subject zone. This new filtration media bed material can be associated with a condition state of "new" or 100% effectiveness, or a useful life of x number of weeks or months. A baseline amount, time in use, or other qualification for a previously used media bed material in one or more zones can also be provided. Other characterizations of the media bed material zone(s) can also be generated, such as information that is derived from environmental sensors, or other information that is relevant to the operation of the subject filtration operation, as discussed hereinafter. In a non-limiting example, a detected signal (or lack thereof) from the sensor or sensor arrangement can be recorded as having a baseline measurement that is correlated with the condition state of the "fresh" filtration media bed material before any gas or liquid stream is brought into contact thereof. The sensor(s) or sensor arrangement associated with the electrical signal-generating material (e.g., corrodible material) or other signal generation functionality is placed in or in communication with a filtration media bed zone such that contact between the sensor(s) and at least some of the gas or liquid phase (or "stream" in the context a gas or liquid phase in a filtration operation) flowing through the filtration apparatus flow path can occur. If the one or more target contaminates to which the sensor(s) are configured are detected in that media bed zone, an electrical signal (e.g., by corrosion of a material associated with the sensor or sensor arrangement), an indication of the presence of a target contaminate in the subject stream can be generated. In some implementations, the detectable electrical or other signal type can be associated with one or more characteristics of the filtration media bed material present in the zone in which the subject sensor(s) or sensor arrangements(s) are associated with. Such characteristics can comprise a condition state, remaining useful life, percentage effectiveness, or the like.

In some implementations, a baseline measurement can be generated for a fresh or newly installed media bed. A target contaminate detection amount obtained from a first filtration media bed zone that is located a distance away from the gas or liquid entry location (e.g., along the gas or liquid stream travel path) will show a detectable amount of target contaminate when the effectiveness of the filtration media bed material in a previous zone has been depleted or exhausted. A change in amount will be detectable over time, for example, sensors or sensor arrangements located closer to the point of exit for the filtration media will show an increase in detectable amount of target contaminate when the filtration effectiveness of prior zones is depleted or exhausted. Such change can indicate the need to change or replenish the media bed material.

The detected electrical or other signals (e.g., corrosion rates, deposition amounts, electrochemical response, optical characteristics, etc.) for the sensor(s) or sensor arrangements) can be correlated or associated with a condition state of the filtration media bed material present in the subject zone. For example, a detected resistance in each of the sensors or sensor arrangements can be correlated with a percentage of effectiveness remaining in the media bed material located proximal to such sensors, and information associated with such effectiveness can be provided of such percentage of effectiveness for that zone and, optionally, zones proximal thereto, in removing a target contaminate(s) from the gas or liquid phase traveling through the filtration system. Still further, a detected resistance or other signal type can be correlated with a time remaining for the effectiveness remaining in the filtration media bed material located proximal to such sensors, and a notification can be provided of such percentage of effectiveness in the removal of a target contaminate(s). Such notifications can be associated with instructions provided to an operator to replace or replenish the filtration media bed material in one or more zones or the entirety of the media bed material.

The ability of a sensor or sensor arrangement to detect a condition state of a filtration media bed material zone(s) can be defined by rules associated with a signal change resulting from an amount of target material detectable at a selected filtration media bed zone. For example, an arbitrary scale can be generated and levels of filtration media bed effectiveness on an individual zone level or overall for the media bed can be assigned thereto. A change of 10% in the detectable signal, for example, a 10% change in resistance, weight/mass or other type of signal, can be correlated with a 10% loss of effectiveness in the filtration media bed material proximal to such the sensor or sensor arrangements where such 10% change is detected. Notifications can be provided to an operator of the relative condition state of an individual zone as a function of the detected signal change such as "filtration media bed is 10% depleted at zone A (or B or C etc.)."

The condition states of each of the filtration media bed material zones can be expected to change at differing rates, at least because those media bed material zones closer to the gas or liquid phase apparatus entry location will come into contact first with the one or more one or more target contaminates. When any of the one or more target contaminates are present in the stream, a first zone can be expected to be operational to remove or deplete such one or more target contaminates if it is still effective for doing so. As such, a condition state indicating 90% depletion in a media bed zone that is located close to the gas or liquid stream entry location may not be a concern if the one or more target contaminates removal effectiveness other media bed material zones have not been so depleted. It can therefore be useful for the sensor or sensor arrangements to independently provide reports of the condition states of a plurality of filtration media bed material zones present in the total media bed material volume as a collection of media bed condition information, such as in the form of notifications.

Rules can be associated with the notifications. For example, if a zone close to the gas or liquid stream entry location is 90% depleted of target contaminate removal effectiveness, but the zones closer to the gas or liquid stream exit location are only 10% depleted of effectiveness, one type of notification can be generated. However, if filtration media bed material zones closer to the gas or liquid phase exit location are indicated to be only 90% depleted of target material removal effectiveness, a more urgent notification, such as an alarm, can be generated. In some circumstances, the filtration system and associated systems can be shut down when notification that the one or more target contaminates removal effectiveness is essentially non-existent, for example, if there is a risk of highly toxic materials being introduced into an environment where damage can occur from the presence of such materials.

Yet further, the amount of target contaminate that has contacted a media bed material by zone over a time period of interest can be detected and information provided therefrom. Again, rules can be generated based on past information to develop predictions or estimations of how much of the one or more target contaminates has passed through one or more zones in the filtration apparatus.

An amount of one or more one or more target contaminates in a gas or liquid stream can be detected from an environment from which the gas or liquid stream is derived when the sensor or sensor arrangement in a zone adjacent to the gas or liquid phase entry location generates information specific to that zone, which will be the first zone contacted by the stream from the environment. Conversely, the effectiveness of a filtration operation can be determined by detecting an amount of one or more target contaminates at a media bed zone adjacent to the gas or liquid phase exit, which will be last zone contacted by the stream prior to exiting into another environment. Thus, the real-time, or substantially real-time, monitoring of the rate of change in signals from the sensor or sensor arrangements can allow monitoring of an environment of interest, as described further hereinafter. Such information can be useful for safety or compliance purposes, for example.

In other implementations, the rate of change in the effectiveness of a media bed over time as compared to expected values for a media bed type can provide useful information. For example, if there is an increase in the amount of a target contaminate as a result of an event associated with a filtration operation environment, for example, a hydrogen sulfide spike in a sewage treatment plant, the effectiveness in removal of this target contaminate by the filtration media bed material will be depleted or diminished at a rate that differs from an expected rate that is commensurate with typical situations. The ability to measure the effect of such a spike at the level filtration media bed zone level can allow an operator to develop better insights into whether and when the all or part of the filtration media bed may need to be replaced or refreshed.

In some implementations, information associated with an event, such as an unexpected release of a target material in an environment being monitored for such target material, can be collected and used to generate information about similarly situated filtration media bed materials being analyzed at a different location. In this regard, information associated with a first filtration media bed at a first location can be used to provide information, such as user notifications, for a second media bed at a second location.

The real-time or substantially real-time filtration media bed material monitoring according to the methodology of the present disclosure can allow each of the plurality of media bed material zones a filtration media bed to be independently monitored on a substantially continuous basis so as to allow for preventive action to be taken before an individual zone or the overall media bed fails and allows the target contaminate to exit the filtration system instead of being captured for removal or depletion by the media bed as intended.

In further implementations, the media bed arrangement can be configured as a plurality of separate stand-alone containers or vessels that can be arranged in series. In this configuration, the filtration media bed arrangement can comprise a plurality of individual filtration elements each having a filtration medium present configured therein. Each of the individual filtration elements are configured so that the gas or liquid travel path comprises each of the individual filtration elements, that is, each of the filtration elements arranged in series. Each filtration element can be in individual communications arrangement with a sensor configured to identify an amount of remaining effectiveness of a filtration medium present in that filtration element. Accordingly, an amount of remaining effectiveness of an individual filtration element can be determined, as set out further herein.

One or more sensors in communications engagement with each individual filtration element can be arranged exterior thereto, for example, a sample of the gas or liquid can be extracted and evaluated in a location that is exterior to that filtration element. For example, an amount of gas or liquid that has traveled through an individual filtration element can be sampled at a location reward of that filtration element such that the sampling location can allow a target gas or contaminate filtration effectiveness of an individual filtration element to be established in real time or substantially in real time. A need to replace or refresh the filtration medium in an individual filtration element can be determined according to a determination of an amount of target contaminate that is (or is not) removed from the gas or liquid during travel thereof through each filtration element. Other benefits associated with an ability to measure the filtration effectiveness (or lack thereof) of an individual media bed zone can be expected for the arrangement of a plurality of individual filtration elements arranged as an arrangement of filtration elements.

One or a plurality of sensors or sensor arrangements in a filtration system can be monitored in real time, substantially in real time, or after completion of a filtration operation. Yet further, one or a plurality of sensors or sensor arrangements configured simultaneously in a plurality of filtration systems at a single location or a plurality of locations can be monitored. Information generated therefrom can be provided as notifications to a user on a device, in a dashboard configuration, as reports, or as information that can be used to develop machine learning processes. For example, notifications provided from the sensors or sensor arrangements in engagement with a filtration system(s) operation can be used to enhance the useful operation of a filtration system(s) at a location, in a plurality of locations, or to develop predictions of future performance of filtration systems.

The information generated in accordance with the processes herein can be generated as a dashboard configuration. As would be understood, a "dashboard" is a view of information that allows a user, manager, owner, etc. to monitor systems and processes of interest, here the filtration processes and media bed monitoring processes of the present disclosure. By collecting information associated with the detection or monitoring of target contaminates or liquids in a single media bed monitoring system or in a collection of media bed monitoring systems in a dashboard configuration, a user can generate a unified view of the performance, useful life remaining in, and/or need for replacement of all or part of a media bed in one or a plurality of filtration systems.

Information derived from the sensors or sensor arrangements can also be used in conjunction with other information, can enhance the operation and, in notable implementations, the safety of, operations where filtration systems are required, or at least are beneficial. For example, information derived from the depletion of media bed effectiveness over a plurality of filtration systems can be analyzed along with other information to generate useful insights. When combined with other sensor data, one or more conditions (e.g., temperature, season, humidity, time, etc.) can be evaluated to derive information about reasons why (or why not) a media bed material may be depleted more (or less quickly), for example. Yet further, the ability to obtain robust data sets associated with the target contaminate can allow useful inferences to be obtained therefrom.

As would be appreciated, information generated from the sensor or sensor arrangements can generate retrospective information that can be useful for compliance and safety requirements. To this end, the operation of the filtration system having data generated therefrom in a continuous or at least partially continuous manner can allow collection of information to demonstrate that a filtration system was operational to suitably remove a target contaminate from an environment in need thereof. Thus, an organization in need of generating compliance information vis a vis a filtration system can suitably collect such information. Moreover, such information collection can allow a safety report to be generated after a safety-related incident to develop insights about a target contaminate that may have been present (or absent) during a time period of interest.

Information generated from the sensors or sensor arrangements can be stored for historical purposes, as well as for providing insights as to the operation and behavior of other systems and environmental conditions associated with the gas and liquid phase filtration systems. Still further, information associated with the amount of a target contaminate that has been detected in a filtration system as measured by signals generated by a sensor or sensor arrangement and information associated therewith can be useful to generate predictions associated with the filtration system, and characteristics or features of the environment proximal to the filtration system. In non-limiting aspects, such prediction information can be useful in determining the replacement cycle for a specific filtration system, and collection of filtration systems, class of filtration systems. For example, analysis of a collection of sensor or sensor arrangement information engaged with a filtration system configured with the media bed configurations according to the disclosure can be useful to generate notifications to a user, supplier, etc. that the media bed will need replenishing at some time in the future as indicated by the specific signals generated by a specific filtration system operational in an environment in need of consistent and robust filtration, such as for safety, environmental compliance, or customer satisfaction, etc. In an implementation, if the rate at which the media bed appears to be depleted is different from a predicted value, notifications can be generated to a user, maintenance person, etc. that there may be a need to investigate the operation of the filtration system and/or the media bed material therein.

In further implementations, the system and methods herein can be configured to align with operation of one or more components that may be associated with operation of the filtration management processes herein. For example, some filtration processes may operate on a periodic basis, such as when a system operator may find it necessary or desirable to operate system on as needed basis, as opposed to full time (e.g., 24 hours a day each day, etc.). The media bed filtration system operation levels or parameters might be seasonal (e.g., more needed in summer months, etc.) or the operation thereof could be affected by the sources of gasses or liquids having different amounts/types of target contaminates therein could be relevant. These and other differences in an amount or type of filtration needed at a location, could affect operation of each filtration system in context. To account for such contextual differences between and among different filtration systems, as well as differences that may exist in the same system at different times. To account for and/or manage such differences, the filtration media effectiveness detection system can be configured to associate a filtration zone (or element) detection system effectiveness level—for example, an amount of useful life associated with the zone (or element) with a run-time of the overall system. It can be expected that more precise determination of the depletion and/or effectiveness of a media bed zone and/or any associated media bed filtration material used therein can be better assessed. This, in turn, can enhance an ability to understand what media bed filtration material may be appropriate under various use cases.

Yet further, the media bed system and/or any individual media bed zones can be in communications engagement with one or more flow metering devices. In this regard, variations in an amount of flow associated with operation of a filtration system can be monitored and/or managed to improve or enhance an associated filtration process. Such information may be used during operation of the same or different machines.

In additional implementations, the system can be configured to modify and/or manage a blower associated with travel of the gas or liquid through the filtration system travel path. In this regard, the system can be operational to vary the speed of blower to provide a desired amount of filtration effectiveness without also expending more energy than necessary to achieve such desired results. Operation can also be monitored and/or managed to better ensure that filtration media is not being depleted at a higher rate than is otherwise necessary to achieve a desired amount of filtration effectiveness. The system can also be configured to allow a user to optimize an amount of filtration media that is depleted, and a replacement rate that is needed therefore. In this regard, a user may determine that they would prefer to reduce a rate at which they need to replace filtration media even when such replacement rate may decrease an amount of target contaminate that is removed via the filtration system. Accordingly, the present disclosure can allow a user to adjust an amount of a target contaminate that is depleted from a gas or liquid stream on an as-needed basis.

The sensor or sensor arrangement-derived information can be incorporated into machine learning systems, along with any other useful information to allow robust predictions to be generated. Any data incorporated into machine learning models and any predictions can comprise at least some human supervision to better ensure the accuracy of predictions. Over time, however, it is expected that there may be lesser need for human supervision.

The systems and methods herein can be configured with a "self-learning" feature. Such "self-learning," which can be considered to comprise a form of the broad category of "artificial intelligence," can have utility in generating instructions for operation of filtration systems. In this regard, operators of filtration plants, biogas production plants etc. can leverage information generated outside of their individual operations to improve operation of their own systems. Such information can be deployable on an as-needed basis.

In further implementations, the disclosure herein comprises a deployable library of information that can be delivered to a manager of a filtration system to enhance operation thereof. By creating a reusable library of information that may be reused for the operation of different filtration systems in different locations that can be operated by different owners, an overall efficiency of filtration system operation may be enhanced. For example, compliance with laws or regulations can be improved. Moreover, residents proximal to filtration systems where toxic or noxious gases may be a common or expected occurrence can be better assured that operation of such facilities can be reduce or substantially eliminate a potential for release from a facility. It follows that construction or continued operation of such facilities may lead to lesser objections.

In accordance with implementations of the present disclosure, a machine learning process may be used to generate information from operation of a plurality of filtration operations. Data associated with such operation can be uploaded to a cloud database for storage, analysis, and subsequent deployment thereof. In this regard, training sets may be generated from prior operations of a plurality of filtration operations in which the media bed arrangement and associated sensor configurations are implemented. Such training sets may be used to define operation of one or more filtration systems on an as-needed basis. The training sets may be provided as an element of an information library configured for delivery to a manager of a filtration system, such as in a deployable API or other functionality that may suitably operate in a relevant filtration environment.

In various examples, target contaminate levels, such as an amount of odor generated by a process associated with the filtration systems herein, may be affected by temperature, season, gas or liquid source, gas or liquid flow rates etc. Information associated with the same or different systems can be leveraged and deployed from a library of information to generate instructions that can enhance current operation of a filtration system. For example, if it is determined that a filtration system designed to filter $H_2S$ in a municipal sewage treatment plant is associated with a faster depletion of media bed filtration media when a temperature is at certain level for a period of time, such information can be deployed to via instructions to enhance operation of the same and similar municipal water treatment systems in different locations according to temperature. Flow rates, media bed replacement or replenishment rates, etc. can be provided to an owner or manager of a filtration system to enhance operation thereof.

In another example, biogas feedstock from a first source may be determined to generate a higher level of $H_2S$ than feedstocks from other sources. When a feedstock is determined to be from a source known to require a greater amount of filtration effectiveness and/or to generate depletion of filtration media at a faster rate, such information can be used to monitor and/or manage operation of a filtration system when the first feedstock is detected, such as by providing an owner or manager of the filtration system with instructions regarding flow rates, media bed replacement or replenishment, etc.

An aspect of the present disclosure includes identification of a type or identity of a type, source, etc. of a gas or liquid having a target contaminate incorporated therein. Such identification can also include determination of a type and/or amount of target contaminate therein. The identification can be associated with a priori information that defines instructions for operation of the filtration system in context, such as gas or liquid flow rate, filtration media depletion and/or replacement rate, and filtration media selection, among other things. Information derived from a first filtration system operation can be leveraged or deployed in operation of a same or different system. Information generated from the operation of a plurality of filtration systems can also be leveraged or deployed in the operation of a first system, a second system, and/or in a plurality of systems.

In accordance with another non-limiting exemplary embodiment of the present disclosure, a master look up table can be generated from one or more filtration systems having known specifications and recorded operational information. The master look up table can be re-deployable for use with other filtration systems having the same or similar configurations, feedstock characteristics, etc. A priori operational information for such information can also be included in the master lookup table. In a current operation of a filtration system, information from the master lookup table can be used to generate instructions for such current operation. Furthermore, information about the current operation can be incorporated into the master lookup table for enhancement thereof, for example, to modify or improve information in the table for use in subsequent operation of the same or a different filtration system.

In further implementations, the filtration systems can be configured to generate information relevant for or required by one or more regulations. Compliance (or lack thereof) with one or more regulations can automatically be determined by the system. Changes or modifications appropriate for operation of a current filtration operation can be deployed from the master lookup table via API etc. to enhance compliance of the current operation.

Yet further, information associated with such compliance (or lack thereof) of a current filtration operation or a collection of filtration operations at one or a collection of filtration operations can automatically be formatted in report form for delivery to a person, agency, authority, etc. having an interest thereof. Such information can also be configured for display in a dashboard format, notification, or other relevant format. Yet further, the generated compliance information can be configured for use in machine learning systems for subsequent operation of the same or different filtration systems.

Using a $H_2S$ target contaminate example, differences in the amount of $H_2S$, as detectable by the sensor or sensor arrangements in engagement with the filtration system, can be analyzed in relation to other information to derive information about an environment proximal to the filtration system. In this regard, when the filtration system having a filtration media configured with sensors or sensor arrangements therein, the levels of $H_2S$ in or emitted from the environment proximal to the intake for the gas stream that may contain the $H_2S$ for removal therefrom can be derived, can be measured. To this end, changes in the signals detectable from the sensors or sensor arrangements after contact with the target contaminates-here $H_2S$—can be processed to allow quantification (i.e., actual/accurate amounts) or qualification (i.e., relative amounts) to provide information about the amount of hydrogen sulfide in the environment at one or more times periods of interest. Changes in the amount of $H_2S$ as it is detected in the filtration system as a function of time, temperature, season, customer volume, etc. as shown from the sensor or sensor arrangement signals, can further allow detection of factors, conditions, etc. that can be found to influence the information generated by the sensor or sensor arrangements in one or a plurality of media bed zones. Such information can be uploaded into the library of information associated with the master lookup table for use in operation of the system or a different filtration operation.

In a further implementation, a sensor or sensor arrangement that is configured to assess the condition of a filtration media bed in a single zone or across a plurality of zones can include functionality that is capable of assessing more than one target contaminate material that may be present in a gas or liquid stream traveling through the media bed arrangement having a plurality of zones or elements during a filtration operation. For example, one or more sensors or sensor arrangements can be configured to detect in the presence of a first target contaminate and one or more sensors or sensor arrangements can be configured to detect the presence of a second target contaminate across a length of the media bed arrangement. As would be appreciated, these different sensor or sensor arrangement characteristics will be indicated by the type of sensor or sensor arrangement, where each of the configurations can be selected for each of the one or more target contaminates that may be present in the gas or liquid stream traveling through the filtration system. Still further a sensor or sensor arrangement can be configurable to detect a plurality of target contaminates in a gas or liquid stream. Information generated from such an operation can be incorporated in the library of information associated with the master lookup table for use as instructions associated with operation of the same or a different filtration system.

In an illustrative example, one or more of the filtration media bed zones can be sampled to assess a level of target contaminate present in the zone in which the sensors or sensor arrangement is included. The relative differences in the amount of target contaminate in the samples can be used to generate information about the filtration media bed effectiveness overall or in each of the zones or collection of zones. For example, information indicating that a first zone is 90% depleted, a second zone is 50% depleted, and a third zone is 10% depleted can be generated. Such information can be used to provide notifications, alarms, etc. pertinent to the operation of the filtration media bed. The amounts of target contaminate entering the filtration system and exiting the filtration system can also be assessed to generate an effectiveness of the overall filtration system in real time.

In some implementations, a priori information derivable from the library of information associated with the master lookup table can be used to modify operation of the filtration system when a prediction can be generated that instructions associated with a current operation of the filtration apparatus is likely to result in too fast of depletion of the media bed material in one or more media bed zones or elements or that effective target contaminate removal is likely to not occur. In this regard, instructions deployable to a manager of a filtration system can instruct the manager to modify one or more parameters associated with the filtration system operation, such as a reduction of flow, pre-emptive replacement or replenishment of the media bed material, etc. In some implementations, a notification can be generated to the manager so that they can review operation of the system in context.

In other implementations, instructions can automatically be deployed to affect operation of a filtration system when the system can predict that suitable operation of the system may or will not result from the current parameters associated with the system operation. For example, if an identity of a biogas feedstock or feedstock source is known by the system to generate an additional risk of toxic or noxious gas when a flow rate of the system is X, the system can be configured to automatically adjust the airflow to a lower level to better ensure effective gas removal from a biogas production operation.

By way of further explanation, by use of one or more sensor or sensor arrangements from which an amount of a target contaminate can be detected in a plurality of filtration media bed zones, an operator can better predict when the effectiveness of the filtration media bed material will be depleted or wholly diminished. In this regard, consider the following example in relation to FIG. 1. In FIG. 1, gas phase filtration system 100, has apparatus housing 105 that is filled with filtration media bed filtration material 110 having, for example, 5 zones 115a, 115b, 115c, 115d, and 115e. Each of zones 115a, 115b, 115c, 115d, and 115e are associated with electrical signal-generating (e.g., corrodible) sensor arrangement 120, 125, 130, 135, and 140, comprising a plurality of sensors (not individually enumerated) wherein each of the sensor arrangements are each, independently, in communications engagement with microprocessor controller 145 or other processing circuitry. For this example, each of the sensors in sensor arrangements 120, 125, 130, 135, and 140 comprise a corrodible material that generates a detectable electrical signal when in contact with a target gas to that generates a corrosion response. When a gas phase enters system 100 via gas phase entry location 150, it will pass through each of filtration media bed material zones 115a, 115b, 115c, 115d, and 115e to exit at gas exit location 155. Gas phase entry 150 and exit 155 locations can be smaller or larger as appropriate, and one or both can be configured with air handling equipment (not shown), such as blowers or the like. If a gas phase is introduced via 150 comprises a target gas that is capable of generating an electrical signal (i.e., corrosion in this example) when coming in contact with the individual sensors 120, 125, 130, 135, and 140, an electrical signal will be generated. Notably, however, the target gas(s) will generate a different electrical signal at sensor arrangement 120 first because that sensor is the first to come into contact with the target gas, with subsequent sensor arrangement 125, etc. experiencing less target gas contact at least because the media bed material in media bed zone will remove some or all of the target gas. While not all of the target gas will first react with (or chemisorb to) sensor arrangement 120, this sensor will likely experience more corrosion relative to the sensors arrangements 125, 130, 135, and 140 that are located farther from gas entry location 150. As noted previously, rules can be generated to correlate or associate the detected signal changes with one or more condition states for the filtration media bed material in one or more filtration media bed material zones.

Moreover, the rate of corrosion of sensor arrangement 120 will eventually slow or even cease after a long enough contact of the sensor arrangement with the target gas. Such detectable rate changes can then be associated or correlated with a determination that the filtration media bed material present in that zone, namely zone 115a, has been depleted such that the target gas is no longer being effectively removed as a gas comprising that target gas travels through zone 115a without or at least with less being removed from the gas stream in that zone. Again, rules can be generated to associate such detectable signal changes with condition states of the filtration media bed material present, as well as the amount of target gas present in a gas phase at a detection time, in each of the zones 115a, 115b, 115c, 115d, and 115e. As would be appreciated, the effectiveness of each filtration media bed material in a zone can be determined in real time, or in substantially real-time, by the ability to assess whether one or more of the media bed zones is capable of effectively removing a target gas therefrom. This methodology thus allows better management of filtration media bed material replacement or refreshing. Moreover, this methodology provides a notable improvement in the ability to manage gas phase filtration in environments where the amount of target gas may vary over time.

Figure 2:
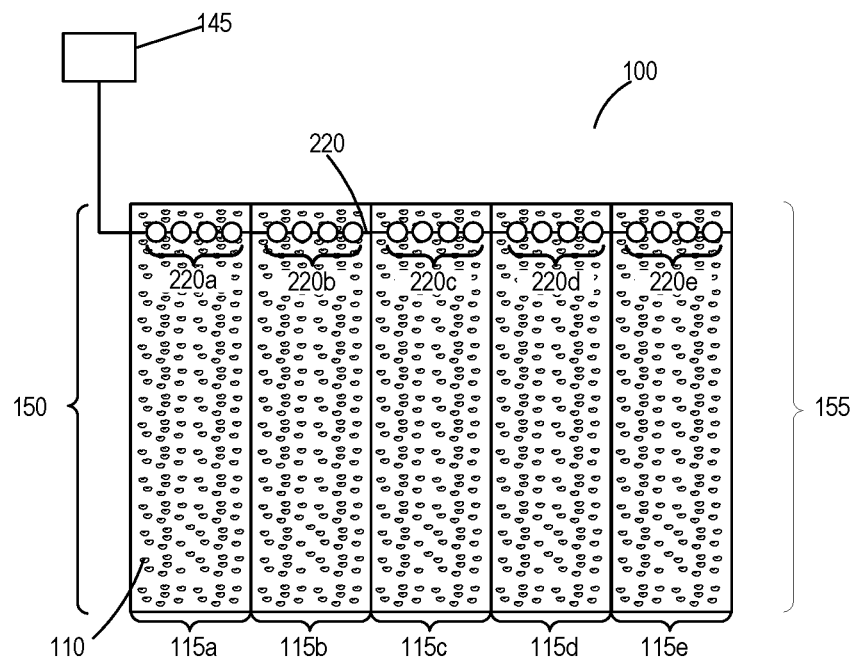
FIG. 2 is an exemplary configuration for a further implementation of the present disclosure using corrodible sensors or sensor arrangements, in accordance with various embodiments of the present disclosure.

In some implementations, a sensor arrangement can each, independently, be associated with an individual filtration media bed material zone. This is illustrated in FIG. 1 in which each of sensor arrangements 120, 125, 130, 135, and 140 is incorporated in each of filtration media bed material zones 115a, 115b, 115c, 115d, and 115e. Yet further, a single sensor arrangement can be configured to extend over and into a plurality of filtration media bed material zones. For example, and as illustrated in FIG. 2, a sensor arrangement 220 can extend across each of zones 115a, 115b, 115c, 115d, and 115e, and each of sub-arrangements of sensor collections 220a, 220b, 220c, 220d, and 220e can be configured to individually detect signal changes in each of the plurality of filtration media bed material zones 115a, 115b, 115c, 115d, and 115e. Still further, there can be fewer sub-arrangements of sensors on sensor 220 can be present, as long as 220 is capable of providing one or more condition states for media bed material 110 for one or more of the zones 115a, 115b, 115c, 115d, and 115e in use.

Figure 3A:
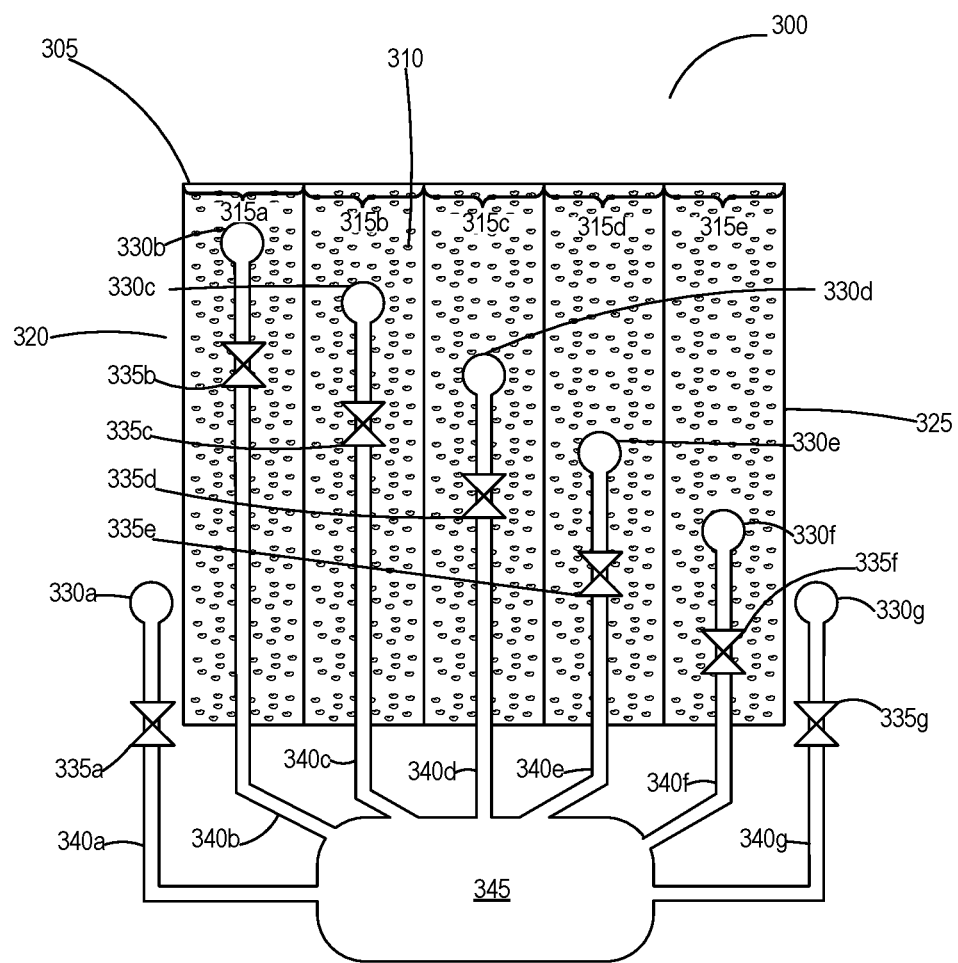
FIG. 3A is an exemplary configuration for further implementation of the present disclosure using gas sampling and analysis, in accordance with various embodiments of the present disclosure.

Referring to FIG. 3A, an offline air or gas sampling method is illustrated. Gas phase filtration system 300 has housing 305 incorporating filtration media bed material 310 in a plurality of zones, here 5 zones denoted as 315a, 315b, 315c, 315d, and 315e, but more or fewer zones can be present. Gas phase entry area 320 indicates the direction of flow of air or gas from the environment that can include one or more target contaminates for removal therefrom. Gas phase exit area is denoted 325 and indicates the location or area from which air or gas from which the one or more target contaminates have been removed or depleted exits. Gas phase entry 320 and exit 325 locations can be smaller or larger as appropriate, and one or both can be configured with air handling equipment (not shown), such as blowers or the like. A plurality of gas sampling ports are arranged proximate to gas phase filtration system 300, namely prior to the gas or air phase entering filtration media bed material 310 at gas sampling port 330a, after the gas or air phase exits the media bed material 310 at gas sampling port 330g, and at each of 5 zones 315a, 315b, 315c, 315d, and 315e as gas sampling ports 330b, 330c, 330d, 330e, and 330f, respectively. Solenoids 335a, 335b, 335c, 335d, 335e, 335f, and 335g control communication of gas sampled from a respective gas sampling port along gas travel paths 340a, 340b, 340c, 340d, 340e, 340f, and 340g into sensor or sensor arrangement and associated detectors shown as 345. Depending on the detection method used, 345 can comprise gas detectors such as electrochemical or optical sensors suitable to measure, such as by quantification of an amount of target gas in a sample removed from an individual zone, to determine the effectiveness (or lack thereof) of a filtration media bed zone. Alternatively, electrical signal-generating sensors or sensor arrangements can be configured in 345. A microcontroller or other processing circuitry can be configurable with 345 to provide instructions associated with the sampling and analysis of gas from the one or more gas sampling ports 330a, 330b, 330c, 330d, 330e, 330f, and 330g. An alternative configuration for each of gas travel paths 340a, 340b, 340c, 340d, 340e, 340f, and 340g can be communicated into a single port (not shown) into 345, with the flow of each of the gas samples therein controlled individually by the operation of electronics associated with 345. Other configurations can also be suitable.

In operation, sampling of gas at locations 320 and 325 can be expected generate different detected amounts by 345 if a target gas is present in the gas phase entering filtration device 300 and filtration media bed material 310 is capable of depleting or exhausting the target gas from a gas phase traveling therein. The filtration media bed material at 315a will contact the target gas first, and as such, will be at least partially depleted prior to contact of the gas phase having a target gas(es) therein with the filtration media bed material in zones 315b, 315c, 315d, and 315e. It follows that a gas sampled at zone 315a should initially show a higher amount of target gas than samples taken from zones farther from entry location 320 if those zones still comprise filtration media bed material 310 that is can effectively remove the target gas from the gas phase. Since the amount of target gas sampled from the gas phase can be quantified (or at least qualified (according to generated rules, the relative effectiveness of each filtration media bed material zone can be determined in real time or substantially real time. When the target gas is sampled at 330g, the relative or actual amount of the gas removed by the filtration media bed material 310 in each of the zones 315a, 315b, 315c, 315d, and 315e can be determined in real time or substantially in real time. As the difference between 330a and zones closer to exit location 325 becomes smaller-thus signifying that less target gas is being removed from the gas phase in earlier zones-information can be provided to an operator instructing him of such status and providing direction for action. Such information can also be incorporated into notifications for servicing, such as by replenishment or replacement, of the filtration media bed material, for example. With generation of such more specific information about the internal operation of the filtration media bed material in use, media bed material selection can be improved, and information related thereto can be used to monitor, detect, and manage the operation of gas phase filtration systems.

Element 345 can be configured in any manner that can facilitate sampling of one or more target contaminates from a filtration media bed zone. For example, air handling, metering, and collection equipment can be incorporated therein. Electronics can also be incorporated therein.

Figure 3B:
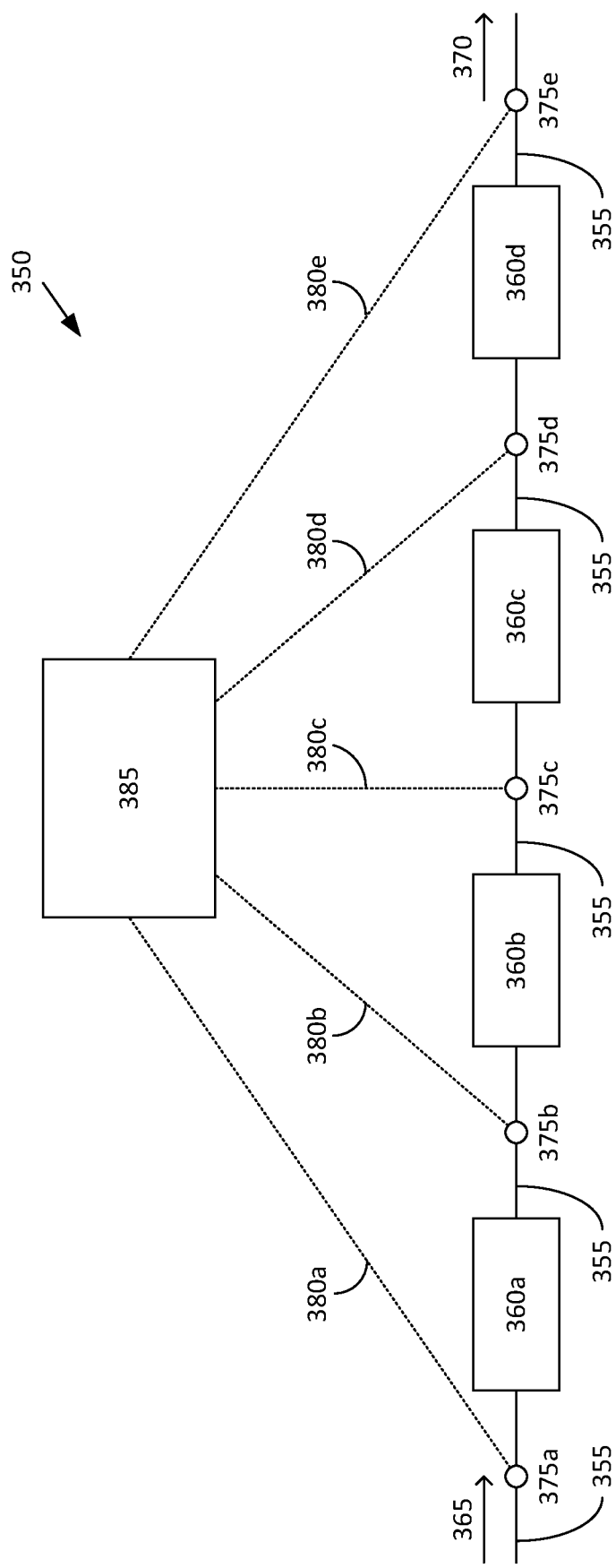
FIG. 3B is an exemplary filtration system configuration for further implementation of the present disclosure using sampling and analysis, in accordance with various embodiments of the present disclosure.

Referring to FIG. 3B, a filtration system 350 is provided having gas or liquid stream travel path 355 in which filtration elements 360a, 360b, 360c and 360d are configured. Gas or liquid stream (not shown) enters travel path 355 at a source or forward location 365 and exits at a rearward location 370. As the gas or liquid stream travels along travel path 355, samples of the gas or liquid stream can be sampled at 375a, 375b, 375c, 375d and 375e where such sampling can provide information about an effectiveness of filtration elements 360a, 360b, 360c and 360d, where such elements comprise individual filtration media (not shown) therein. Samples of the gas or liquid stream at each location can be transported via sample ports 380a, 380b, 380c, 380d, and 380e for analysis by electronic bed monitor 385 having sensor and reporting functionalities as discussed elsewhere herein.

Figure 4:
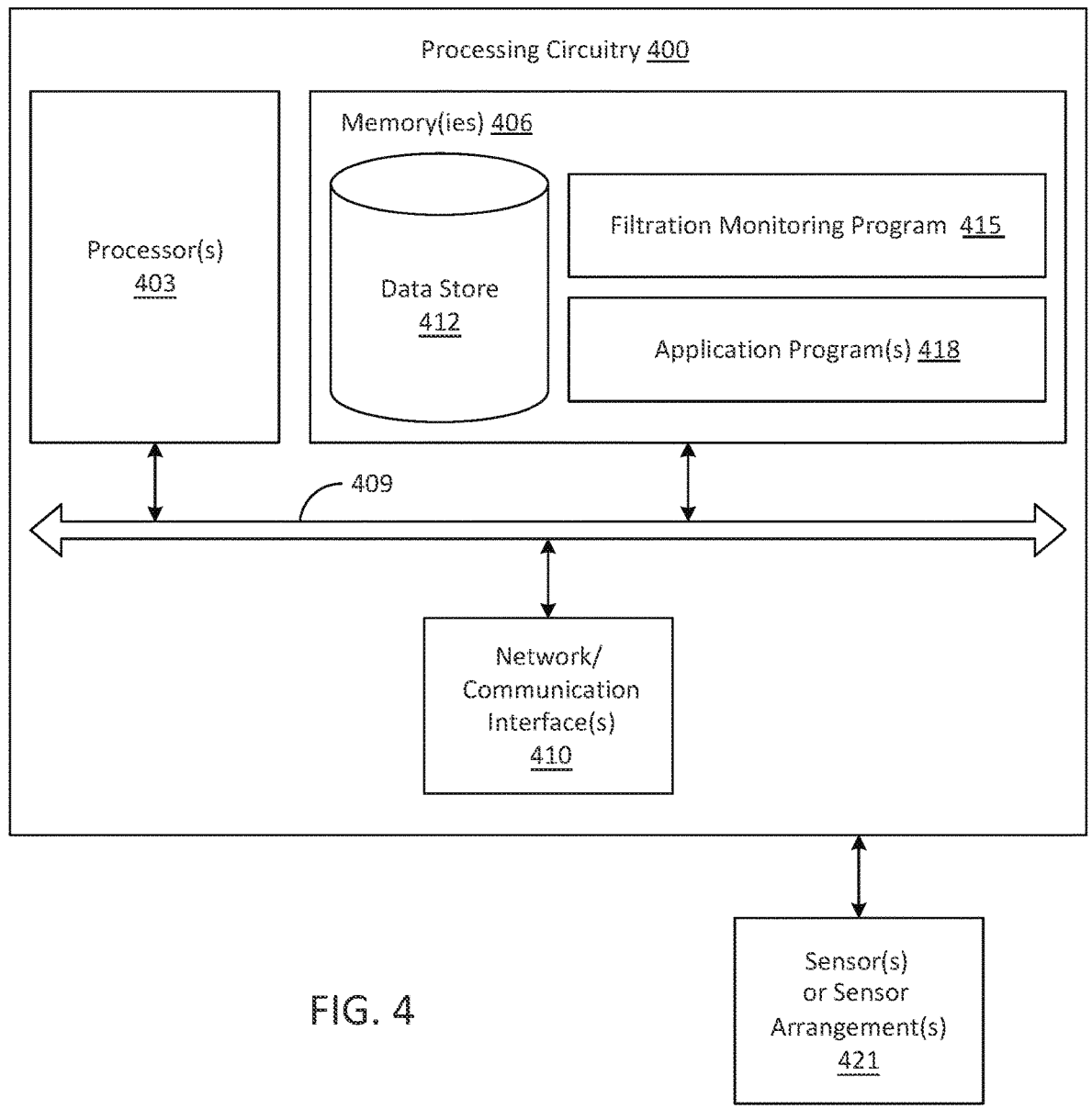
FIG. 4 is a schematic diagram illustrating an example of a processing circuitry that can be used to monitor sensors or sensor arrangements, in accordance with various embodiments of the present disclosure.

With reference to FIG. 4, shown is a schematic block diagram of an example of processing circuitry 400. In some embodiments, among others, the processing circuitry 400 may represent a processing device (e.g., a microprocessor controller or microcontroller) or a computing device (e.g., a smartphone, tablet, computer, etc.). The processing circuitry 400 can include at least one processor circuit, for example, having a processor 403 and a memory 406, both of which are coupled to a local interface 409. To this end, the processing circuitry 400 may comprise, for example, at least one server computer or like device, which can be utilized in a cloud-based environment. The local interface 409 may comprise, for example, a data bus with an accompanying address/control bus or other bus structure as can be appreciated.

In some embodiments, the processing circuitry 400 can include one or more network/communication interfaces 410. The network/communication interfaces 410 may comprise, for example, a wireless transmitter, a wireless transceiver, and/or a wireless receiver. As discussed above, the network interface 410 can communicate to a remote computing device or a user device using a Bluetooth®, WiFi, or other appropriate wireless protocol. As one skilled in the art can appreciate, other wireless protocols may be used in the various embodiments of the present disclosure. In addition, the processing circuitry 400 can be in communication with one or more sensor(s) or sensor arrangement(s) 421.

Stored in the memory 406 can be both data and several components that are executable by the processor 403. In particular, stored in the memory 406 and executable by the processor 403 can be, e.g., a filtration monitoring program 415 and potentially other application program(s) 418. Also stored in the memory 406 may be a data store 412 and other data. In addition, an operating system may be stored in the memory 406 and executable by the processor 403.

It is understood that there may be other applications that are stored in the memory 406 and are executable by the processor 403 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, holographic storage, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors 403 and/or multiple processor cores, and the memory 406 may represent multiple memories 406 that operate in parallel processing circuits, respectively. In such a case, the local interface 409 may be an appropriate network that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although the filtration monitoring program 415 and other application program(s) 418 described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

Also, any logic or application described herein, including the filtration monitoring program 415 and the application program 418, that comprises software or code can be embodied in any non-transitory computer-readable medium for use by or in connection with an instruction execution system such as, for example, a processor 403 in a controller or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the filtration monitoring program 415 and the other application program(s) 418, may be implemented and structured in a variety of ways. For example, one or more applications described may be implemented as modules or components of a single application. Further, one or more applications described herein may be executed in shared or separate processing circuitry or controllers, or a combination thereof. For example, a plurality of the applications described herein may execute in the same microcontroller, or in multiple microcontrollers in the same computing environment. Additionally, it is understood that terms such as "application," "service," "system," "engine," "module," and so on may be interchangeable and are not intended to be limiting.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

What is claimed is:

1. A system for operation of a gas or liquid phase filtration system comprising:
   a. an apparatus comprising:
      i. a gas or liquid phase entry location;
      ii. a gas or liquid phase travel path; and
      iii. a gas or liquid phase exit location;
   b. a housing;
   c. a media bed arrangement configured on an interior of the housing, comprising:
      i. at least three media bed zones arranged in series to define the gas or liquid phase travel path, wherein the at least three media bed zones comprise:
         1. A first media bed zone at a forward location in the media bed arrangement and having a front location defining the gas or liquid phase entry location;
         2. An interior media bed zone positioned between the first and a last media bed zone; and
         3. The last media bed zone at a rearward location in the media bed arrangement and having a forward location proximate to a media bed zone that is not the first media bed zone and a rearward location defining the gas or liquid phase exit location;
      and wherein each of the at least three media bed zones is each, independently, configured with a media bed material selected to remove at least some of one or more target contaminates from a gas or liquid phase flowing through the gas or liquid phase travel path;
   d. at least one sensor or sensor arrangement positioned at a location exterior to the housing that is isolated from the gas or liquid phase travel path, wherein each sensor or sensor arrangement is configured to detect an amount of one or more target contaminates in a media bed zone during one or more times during a gas or liquid phase filtration operation, and wherein:
      i. each media bed zone is in independent fluid communication with a sensor or sensor arrangement via one or more sampling ports configured to remove a portion of a gas or fluid traveling in the media bed zone and to communicate the portion of the gas or fluid to the sensor or sensor arrangement;
      ii. each at least one sensor or sensor arrangement is configured to detect one or more signal changes associated with a presence or absence of the one or more target contaminates in each at least three media bed zones during the gas or liquid phase filtration operation independently of an amount of the one or more target contaminates present in another media bed zone while the gas or liquid phase is moving through the gas or liquid phase travel path; and
      iii. a detected amount for the one or more target contaminates is provided for each media bed zone independently of another media bed zone, thereby providing information associated with an amount of remaining life of each of the media bed material in each media bed zone;
   e. a microprocessor in communications engagement with the at least one sensor or sensor arrangement, wherein:
      i. the microprocessor is in network communication with a cloud computing system configured to:
         1. Receive information generated from operation of the system during the gas or liquid phase filtration operation; and
         2. Deploy information from a database of information derived from one or more previous gas or liquid phase filtration operations.

2. The system of claim 1, wherein the deployed information is derived from operation of a collection of filtration systems installed at the same or different locations.

3. The system of claim 1, wherein either or both of the deployed or received information is associated with one or more of:
   a. a condition state for the media bed material in each media bed zone during the gas or liquid phase filtration operation;
   b. an amount of the one or more target contaminates at the first media bed zone in direct communications engagement with the gas or liquid phase entry location during the gas or liquid phase filtration operation; or
   c. an amount of the one or more target contaminates at the last media bed zone that is in direct communications engagement with the gas or liquid phase exit location during the gas or liquid phase filtration operation.

4. The system of claim 1, wherein either or both of the deployed or received information is associated with one or both of a filtration efficiency of each of the media bed zones or an overall efficiency of the media bed arrangement during the one or more previous gas or liquid phase filtration operations and wherein information associated with the filtration efficiency is derived from one or more operational parameters of the system generated during the one or more previous gas or liquid phase filtration operations.

5. The system of claim 1, wherein either or both of the deployed or received information is associated with media bed material condition state indicating an amount of remaining effectiveness for the media bed material in each media bed zone, thereby providing information associated with a need to replace or replenish the media bed material in each media bed zone.

6. The system of claim 1, wherein the media bed material is selected for removal of at least one target contaminate during the gas or liquid phase filtration operation by physical absorption, physical adsorption, or chemical reaction between the one or more target contaminates and at least some of the media bed material in each media bed zone.

7. The system of claim 1, wherein each of the at least one sensor or sensor arrangement comprises a corrodible material configured to corrode in the presence of at least one of the one or more target contaminates during the gas or liquid phase filtration operation.

8. The system of claim 1, wherein
a. each sensor arrangement comprises a plurality of sensors configured with a first corrodible material; and
b. each of the plurality of sensors is independently configured with a different amount of the first corrodible material, thereby generating different levels of signal changes for detection when each of the plurality of sensors in each sensor arrangement is contacted with at least one of the one or more target contaminates during the gas or liquid phase filtration operation.

9. The system of claim 1, wherein the received or deployed information is associated with one or more of:
a. a timeline of the detection of the amount of the one or more target contaminates by the media bed material in each of the at least three media bed zones;
b. a prediction of a remaining effectiveness of the media bed material in each of the at least three media bed zones;
c. an amount of the one or more target contaminates in an environment proximal to the gas or liquid phase entry location; and
d. an amount of the one or more target contaminates in an environment proximal to the gas or liquid phase exit zone.

10. The system of claim 4, wherein the one or more operational parameters comprise:
a. an installed location of the system;
b. a manufacturer of the system;
c. an operator of the system; or
d. one or more rules or instructions associated with operational compliance of the system.

11. The system of claim 4, wherein the one or more operational parameters comprises:
a. an environmental temperature;
b. a time period or season;
c. a gas or liquid flow rate through the media bed arrangement;
d. a feedstock identity or type;
e. a filtration media type;
f. a media zone cross-sectional volume; or
g. a media bed arrangement cross-sectional volume.

12. The system of claim 1 wherein:
a. the system is configured for treatment of wastewater; and
b. the one or more target contaminates comprise hydrogen sulfide.

13. The system of claim 1 wherein:
a. the system is associated with a biogas production process; and
b. the one or more target contaminates comprise hydrogen sulfide.

14. The system of claim 1, wherein the system is in communications engagement with a second sensor system configured to detect a presence of a different target contaminate present in the gas or liquid stream during the gas or liquid phase filtration operation.

15. The system of claim 14, wherein:
a. the gas or liquid phase filtration operation is associated with a biogas production process; and
b. the different target contaminate comprises water.

16. The system of claim 13, wherein either or both of the deployed or received information is associated with one or more of:
a. a feedstock type or source;
b. a flow rate;
c. an environmental temperature at which the first filtration operation is conducted;
d. a location of the biogas production process;
e. a media bed material composition;
f. a manufacturer of equipment associated with the biogas production process;
g. an intended composition of biogas output from the biogas production process; or
h. one or more compliance-related rules associated with emissions of gasses during the biogas production process.

17. The system of claim 1, wherein the one or more target contaminates comprise:
a. hydrogen sulfide;
b. oxygen;
c. methane;
d. carbon dioxide; or
e. hydrogen.

* * * * *